(12) United States Patent
Naono

(10) Patent No.: US 11,933,709 B2
(45) Date of Patent: Mar. 19, 2024

(54) SENSOR FOR PARTICLE IDENTIFICATION, MEASUREMENT INSTRUMENT, COMPUTER DEVICE, AND SYSTEM

(71) Applicant: Aipore Inc., Tokyo (JP)

(72) Inventor: Norihiko Naono, Tokyo (JP)

(73) Assignee: Aipore Inc., Tokyo (JP)

( * ) Notice: Subject to any disclaimer, the term of this patent is extended or adjusted under 35 U.S.C. 154(b) by 205 days.

(21) Appl. No.: 17/629,219

(22) PCT Filed: Oct. 11, 2019

(86) PCT No.: PCT/JP2019/040313
§ 371 (c)(1),
(2) Date: Jan. 21, 2022

(87) PCT Pub. No.: WO2021/070385
PCT Pub. Date: Apr. 15, 2021

(65) Prior Publication Data
US 2022/0317016 A1    Oct. 6, 2022

(51) Int. Cl.
*G01N 15/12* (2006.01)
*G01N 15/10* (2006.01)
(52) U.S. Cl.
CPC ... *G01N 15/131* (2024.01); *G01N 2015/1029* (2024.01); *G01N 2015/103* (2024.01); *G01N 2015/135* (2024.01)
(58) Field of Classification Search
USPC ....................................................... 324/71.1
See application file for complete search history.

(56) References Cited

U.S. PATENT DOCUMENTS

2002/0026292 A1    2/2002 Isami
2012/0152745 A1    6/2012 Corbett et al.
(Continued)

FOREIGN PATENT DOCUMENTS

JP    2002-139502 A    5/2002
JP    2010-249607 A    11/2010
(Continued)

OTHER PUBLICATIONS

Extended European Search Report for European Application No. 19948340.5, dated Sep. 9, 2022, 10 pages.
(Continued)

*Primary Examiner* — Vincent Q Nguyen
(74) *Attorney, Agent, or Firm* — Peter W. Schroen; Bret E. Field; Bozicevic, Field & Francis LLP

(57) ABSTRACT

A sensor for particle identification includes a first chamber configured to be filled with an electrolytic solution; a first electrode provided inside the first chamber and configured to be connected to an external power supply for applying a voltage; a second chamber configured to be filled with the electrolytic solution; a second electrode provided inside the second chamber and configured to be connected to the external power supply; a data output configured to output measurement data expressing an ion current generated between the first electrode and the second electrode; a partition separating the first chamber and the second chamber; and a presentation device for providing a unique identifier to an external computer device over a network.

10 Claims, 21 Drawing Sheets

(56) References Cited

U.S. PATENT DOCUMENTS

| | | | |
|---|---|---|---|
| 2014/0099726 A1* | 4/2014 | Heller | G01N 33/48721 |
| | | | 422/82.01 |
| 2014/0251825 A1 | 9/2014 | Van Der Voorn et al. | |
| 2014/0374255 A1 | 12/2014 | Hongo et al. | |
| 2015/0377763 A1 | 12/2015 | Brun et al. | |
| 2017/0091427 A1 | 3/2017 | Massingham | |
| 2019/0244056 A1* | 8/2019 | Roy | G06N 7/01 |
| 2019/0257787 A1 | 8/2019 | Washio et al. | |
| 2019/0384047 A1 | 12/2019 | Johnson et al. | |
| 2020/0225198 A1 | 7/2020 | Suzuki et al. | |

FOREIGN PATENT DOCUMENTS

| | | |
|---|---|---|
| JP | 2014-521962 A | 8/2014 |
| JP | 2015-107091 A | 6/2015 |
| JP | 2016-200608 A | 12/2016 |
| JP | 2017-120257 A | 7/2017 |
| JP | 2017-156168 A | 9/2017 |
| JP | 2017-156324 A | 9/2017 |
| WO | WO2013137209 A1 | 9/2013 |
| WO | WO2014122873 A | 8/2014 |
| WO | WO2019032723 A1 | 2/2019 |

OTHER PUBLICATIONS

Arima et al., Selective detections of singleviruses using solid-state nanopores, Scientific Reports, vol. 8, Article No. 16305(2018).
Tsutsui et al., Discriminating single-bacterial shape using low-aspect-ratio poresScientific Reports, vol. 7, Article No. 17371(2017).
International Preliminary Report on Patentability for PCT Application No. PCT/JP2019/040313 dated Apr. 21, 2022, 9 pages.

\* cited by examiner

Fig. 8

| SENSOR MODEL ID 810 | PORE DIAMETER 820 | MEMBRANE THICKNESS 830 | MEMBRANE MATERIAL 840 | SENSOR STRUCTURE 850 | ELECTRODE MATERIAL 860 | CAPACITANCE (1X PBS) 870 | PORE SURFACE TREATMENT 880 | 731 |
|---|---|---|---|---|---|---|---|---|
| 821 | int (nm) | int (nm) | string | string | string | int (pF) | string | |
| X001001 | 300 | 50 | SiN | A1 | Ag/AgCl | 20 | not used | |
| X002001 | 1200 | 50 | SiN | A1 | Ag/AgCl | 34 | not used | |
| X003001 | 300 | 50 | SiN | B2 | Ag/AgCl | 29 | dopamin 883 | |
| ... | ...823 | ...833 | ...843 | ...853 | ...863 | ...873 | ...881 | |

| SENSOR ID | SENSOR MODEL ID |
|---|---|
| 3215-00001 | X001001 |
| 3215-00002 | X001001 |
| 3215-00003 | X001001 |
| 3215-00004 | X002001 |
| 3215-00005 | X001002 |
| 3215-00006 | X003001 |
| . . . . | . . . . |

Fig. 14

| MEASUREMENT ID | KNOWN CLASS | SENSOR MODEL ID | BUFFER SOLUTION | BUFFER SOLUTION CONCENTRATION | MEASUREMENT INSTRUMENT MODEL | EQUIPMENT MODEL | DIGITIZED BITS | AMPLIFICATION FACTOR (10^n) | SAMPLING RATE (kHZ) | ... |
|---|---|---|---|---|---|---|---|---|---|---|
| | string | string | string | float | string | string | int | int(10^n) | | |
| 235071 | A1, A2, A3 | X001001 | PBS | 0.5 | AT-1000 | BC-1 | 12 | 8 | 250 | ... |
| 235072 | B1, B3 | X001001 | PBS | 0.5 | AT-1100 | BC-1 | 12 | 8 | 250 | ... |
| 235073 | C1, C2, C3, C4 | X003001 | Tris-HCl | 0.25 | AT-1100 | BC-1 | 16 | 8 | 500 | ... |
| 235074 | | X001001 | PBS | 0.5 | AT-1100 | BC-1 | 12 | 8 | 250 | ... |
| ... | | | | | | | | | | |

Fig. 16

| MEASUREMENT ID | $w_{11}^{(l)}$ | $w_{12}^{(l)}$ | $w_{13}^{(l)}$ | . . . . |
|---|---|---|---|---|
| 235071 | 0.2325 | 0.4512 | 0.2014 | . . . . |
| 235072 | 0.2361 | 0.3336 | 0.4112 | . . . . |
| 235072 | 0.0272 | 0.1231 | 0.0224 | . . . . |
| . . . | . . | . . | . . | |

SENSOR FOR PARTICLE IDENTIFICATION, MEASUREMENT INSTRUMENT, COMPUTER DEVICE, AND SYSTEM

TECHNICAL FIELD

The present invention relates to a sensor for particle identification. The present invention also relates to a measurement instrument, a computer device, and a system for particle identification.

BACKGROUND ART

Various methods have been proposed as means for identifying particles of sub-micron size such as viruses, bacteria, and exosomes, including optical methods such as an induced diffraction grating method (Patent Literature 1) and a laser Doppler electrophoresis method (Patent Literature 2); a method of using a nucleic acid probe (Patent Literature 3); and a method of using an antigen-antibody reaction (Patent Literature 4). However, none of these conventional methods have been able to solve the problems of low accuracy, many analysis steps, and high cost.

Also, in the case of bacteria and viruses in particular, if the particle concentration in the specimen is low, culturing of the specimen is necessary in many cases, and an instantaneous identification means has not been provided up to now.

A method of identifying particles of sub-micron size has been proposed in which the particle volume is measured by measuring transient changes in an ion current when the particles to be measured in an electrolytic solution pass through a pore (Patent Literature 5).

With the technology that measures transient changes in an ion current when the particles to be measured in an electrolytic solution pass through a pore, by forming the pore using a silicon thin film and reducing the thickness of the pore to 100 nm or less, it is possible to measure not only the volume of the particles to be measured but also information such as the microstructure and the surface charge (Patent Literature 6). Furthermore, by combining the transient changes in the ion current with information processing through machine learning, it is also possible to identify what the particles to be measured are with high accuracy (Patent Literature 7).

Such particle identification combining passage through a pore and machine learning has a wide range of application, and enables accurate and fast identification in a variety of fields from bacteria (Non Patent Literature 1), viruses (Non Patent Literature 2), and exosomes (Patent Literature 8) to air pollutants, rapid blood diagnosis, and pigments.

When attempting to actually use a pore passage sensor, the particles to be measured are diverse and have greatly different sizes, shapes, changes in shape when passing through a pore, and surface charges. For example, whereas bacteria range in size from 1 μm to 5 μm, viruses are smaller and range approximately from 20 nm to 300 nm. For this reason, it is unrealistic to identify all types of particles with a single type of sensor, and it is necessary to change the diameter of the pore depending on the application. Moreover, since the charge state differs greatly depending on the particle, it is also necessary to select an optimal value for the concentration of the electrolytic solution used for measurement (also referred to as the "buffer solution" or the "buffer" in the present specification) for each type of particle to be measured.

In addition, the shape of the sensor and the concentration of the electrolytic solution used influence the transient changes in the ion current described above. For example, transient changes in the ion current are mainly caused by the repulsion of nearby electrolytic solution when the particles to be measured pass through the pore. Consequently, if the case where a particle passes through a large pore is compared to the case where the same particle passes through a small pore, the transient changes in the current are larger in the latter case. The pore thickness of the sensor also exerts a large influence on the electric field distribution near the pore, and consequently exerts a large influence on the transient changes in the ion current. Furthermore, the sensor structure and the type of electrolytic solution also exert a large influence on the electrical properties of the sensor. For example, the capacitance between the electrodes of the sensor changes markedly depending on the sensor structure and the type of electrolytic solution. Such changes in the capacitance not only cause the current signal outputted by the sensor itself to change, but also exert a large influence on the band and noise in an amplifier that amplifies the signal. Otherwise, factors such as the equipment that connects the sensor to the amplifier and the circuit parameters of the amplifier also influence the transient changes in the current.

Learning and identification in machine learning require measurement performed under the same conditions. Sensors or amplifiers with different structures or characteristics, if used for learning and identification in machine learning, make it unable to calculate the correct machine learning optimization parameters, and consequently there is a problem in that particle identification becomes impossible or the identification accuracy is lowered. However, identifying various particles through machine learning as described above requires the use of various types of sensors and amplifiers in actuality. For this reason, the correct learning and identification of various types of particles have not been achieved with the methods and systems of the related art.

CITATION LIST

Patent Literature

Patent Literature 1: Japanese Patent Laid-Open No. 2010-249607
Patent Literature 2: Japanese Patent Laid-Open No. 2016-200608
Patent Literature 3: Japanese Patent Laid-Open No. 2015-107091
Patent Literature 4: Japanese Patent Laid-Open No. 2017-156324
Patent Literature 5: Japanese Translation of PCT International Application Publication No. 2014-521962
Patent Literature 6: International Publication No. WO 2013/137209
Patent Literature 7: Japanese Patent Laid-Open No. 2017-120257
Patent Literature 8: Japanese Patent Laid-Open No. 2017-156168

Non Patent Literature

Non Patent Literature 1: M. Tsutsui et al., Scientific Reports, volume 7, Article number: 17371 (2017)
Non Patent Literature 2: A. Arima et al., Scientific Reports, volume 8, Article number: 16305 (2018)

SUMMARY OF INVENTION

Technical Problem

In the light of the problems with the related art described above, there is a demand to achieved accurate identification through machine learning, even if the measurement conditions such as the sensor and the type of electrolytic solution change.

Solution to Problem

In embodiments of the present invention, the following aspects may be provided to address the above problem.

A sensor for particle identification, the sensor comprising:
a first chamber configured to be filled with an electrolytic solution;
a first electrode provided inside the first chamber and configured to be connected to an external power supply for applying a voltage;
a second chamber configured to be filled with an electrolytic solution;
a second electrode provided inside the second chamber and configured to be connected to the external power supply;
a data output means configured to output measurement data expressing an ion current generated between the first electrode and the second electrode;
a partition separating the first chamber and the second chamber; and
a presentation means for providing a unique identifier to an external computer device over a network, wherein
the partition includes a pore connecting the first chamber and the second chamber,
a physical property of the sensor is associated with the unique identifier,
the sensor is configured such that when a particle passes through the pore, a transient change dependent on at least a physical property of the pore and a physical property of the particle occurs in the ion current generated between the first electrode and the second electrode,
the unique identifier is configured to cause the external computer device receiving the unique identifier to perform a process of identifying the particle according to the physical property of the sensor associated with the unique identifier, and
the physical property of the sensor at least includes a physical property of the pore.

A measurement instrument, comprising:
the above sensor;
an amplifier configured to amplify data outputted from the data output means included in the sensor;
a digitizer configured to A/D convert the data amplified by the amplifier; and
a means that transmits the data A/D converted by the digitizer and the unique identifier provided by the presentation means included in the sensor to the external computer device.

A computer device for particle identification, the device comprising:
at least one processor;
at least one storage means;
a reading means configured to receive a first unique identifier associated with a first physical property of a first sensor and save the received first unique identifier in the storage means with the processor;
a feature quantity extraction means configured to receive first measurement data from the first sensor that measures a known particle belonging to a known class, extract first feature quantity information with the processor, and save the extracted first feature quantity information in the storage means; and
a learning means configured to generate, with the processor, a machine learning optimization parameter by treating the first feature quantity information and the first physical property associated with the first unique identifier as teaching data and treating the known class as a teaching label.

A system for particle identification, the system comprising:
a plurality of sensors; and
a computer device configured to receive, from each of the plurality of sensors, a physical property of each sensor, measurement data measured by each sensor, and a unique identifier for each sensor over a network, and save the received information in association with each other in a database, wherein
the computer device is configured to extract feature quantity information from measurement data related to a measurement of a known particle belonging to a known class performed by one or more of the plurality of sensors, generate a machine learning optimization parameter by treating at least the feature quantity information as teaching data, and save the generated machine learning optimization parameter in association with the unique identifier of each of the one or more sensors in the database, and
the computer device is configured such that, upon detecting that a process of identifying an unknown particle is to be performed using a specific sensor from among the plurality of sensors, the computer device searches the database for a machine learning optimization parameter usable for identifying the unknown particle with the specific sensor, and if an available machine learning optimization parameter exists, the computer device transmits, over a network, a notification including a measurement condition under which a measurement of the unknown particle by the specific sensor should be performed on a basis of a physical property of a sensor associated with the unique identifier associated with the available machine learning optimization parameter, and causes the specific sensor to adjust the measurement condition.

Advantageous Effects of Invention

With the sensor, measurement instrument, computer device, or system provided by an embodiment according to the present invention, the effect of achieving accurate identification through machine learning even under various measurement conditions is obtained.

BRIEF DESCRIPTION OF DRAWINGS

FIG. 8 illustrates an example of a physical properties table according to an embodiment of the present invention.

FIG. 9 illustrates an example of a sensor model ID table according to an embodiment of the present invention.

FIG. 14 illustrates an example of a measurement conditions tables (measurement tables) according to an embodiment of the present invention.

FIG. 16 illustrates an example of a machine learning optimization table according to an embodiment of the present invention.

DESCRIPTION OF EMBODIMENTS

Figure 1:
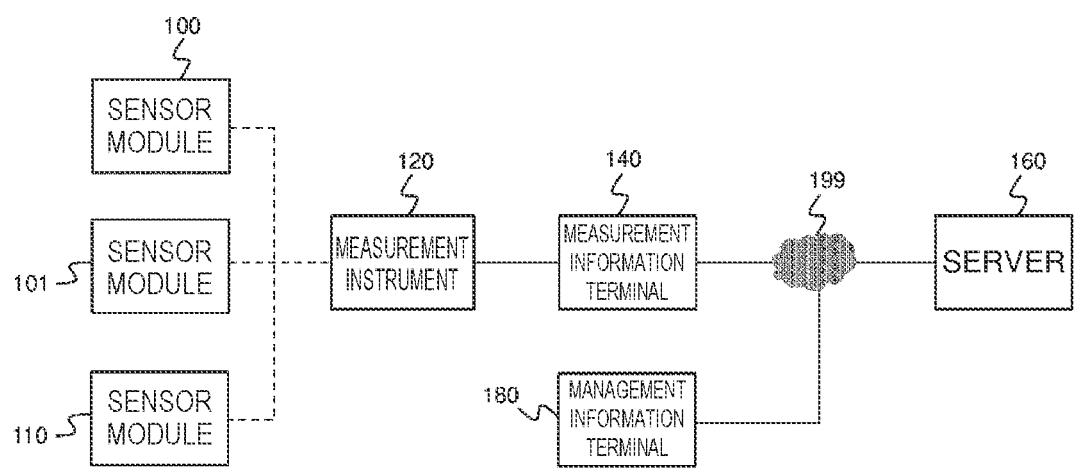
FIG. 1 is a schematic diagram of a system according to an embodiment of the present invention.

First, an overview of a processing method according to an embodiment of the present invention will be given. FIG. 1 illustrates a schematic diagram of a system according to one embodiment of the present invention. The system includes a plurality of sensor modules 100, 101, and 110, a measurement instrument 120, a measurement information terminal 140, a management information terminal 180, and a server 160. The server 160, the measurement information terminal 140, and the management information terminal 180 may be interconnected through a network 199. The measurement information terminal 140 is connected to the measurement instrument 120 and may receive measurement data from each sensor module (hereinafter simply referred to as the "sensor(s)"). It should be noted that the configuration is not limited to FIG. 1 and that the directions, scale, connections, and order of layers in the diagrams included in the present specification are merely examples and are freely changeable as needed insofar as the effects of the present invention are obtained.

Each sensor module includes a pore as described later, and is configured to measure transient changes in an ion current when particles to be measured in an electrolytic solution pass through the pore. The transient changes are dependent on at least the physical properties of the pore (such as the diameter and shape of the pore and the characteristics of a surface treatment applied to the pore) and the physical properties of the particles (such as the size and shape of the particles). In another embodiment, the transient changes may further depend on other physical properties of the sensor. Examples of such other physical properties include the material and shape of a partition included in the sensor, the material and shape of a chamber (or chambers), the material and shape of an electrode (or electrodes), the capacitance of the sensor, the type, concentration, and temperature of the electrolytic solution filling the sensor, and a manufacturing history of the sensor (such as a history of heat and pressure applied in the process of manufacturing the sensor).

Because the sensors (or pores thereof) have different physical properties (or diverse) as described above, even if the same particle is subjected to multiple types of sensors, the obtained features will be different. In an embodiment of the present invention, such sensor diversity is taken into account to exhibit a pronounced effect of enabling particles to be identified suitably through learning no matter what kind of sensor is used.

A particle identification technique (processing method) according to an embodiment of the present invention will be described. First, as a first stage of the processing method, the management information terminal 180 sends a sensor ID (also referred to as a "unique identifier" in the present specification; an identifier having a function of uniquely specifying each sensor) and physical property information about each of the sensors 100, 101, and 110 to the server 160 over the network 199, and the server 160 stores the received information in association with each other.

The management information terminal 180 may obtain the above information by (although not illustrated) connecting to each sensor module, the measurement instrument 120, or the measurement information terminal 140, or the above information may be supplied by a user or an administrator of the system to the management information terminal 180 through some kind of input means.

For example, the sensor ID assigned to each sensor may be read by a reading means (such as a known optical reading means) connected to the management information terminal 180 and saved in a storage means to which the management information terminal 180 connects. Alternatively, the management information terminal 180 or the server 160 may connect over the network 199 to a database that stores information related to the physical properties of the sensors provided by a provider (or seller) of the sensors, and the information may be downloaded and saved in a storage means. In this case, the information related to the physical properties of the sensors is preferably associated with the sensor ID assigned to each sensor.

In any case, the sensor ID and the associated information related to the physical properties of each sensor are stored in (a storage unit connected to) the server 160 (through the management information terminal 180 or the network 199, for example).

As a second stage, "a learning process using machine learning", of the processing method, the sensor 100 generates a pulse waveform associated with the passage through the pore of a particle of which the type is already known (hereinafter referred to as the "known particle"), the measurement instrument 120 amplifies the waveform, and the measurement information terminal 140 extracts features of the waveform. Thereafter, the sensor ID of the sensor 100 and information indicating the type of the known particle (hereinafter referred to as "known class information") may be sent together to the server 160 over the network 199, and the server 160 may store the information.

Additionally, the sensor 101 generates a pulse waveform of another known particle of a different type from the above known particle, the measurement instrument 120 amplifies the waveform, the measurement information terminal 140 extracts features of the waveform, the sensor ID of the sensor 101 and the known class information of the particle are sent together to the server 160 over the network 199, and the server 160 stores the information. On the basis of the waveform features and known class information of the two types of known particles measured by the sensors 100 and 101, the server 160 may calculate and store machine learning optimization parameters.

Additionally, the machine learning may correspond to the physical properties of the sensor associated with the corresponding sensor ID. For example, the physical properties of the sensor that measured a known particle may be used as teaching data for machine learning (in other words, learning using the physical properties of the sensor is performed). Alternatively, machine learning optimization parameters may be saved in a storage means in association with the sensor ID, and the machine learning optimization parameters may be used when measuring an unknown particle with a sensor having physical properties close to the sensor with the sensor ID.

Note that in the present embodiment, the server 160 calculates the machine learning optimization parameters, but in another embodiment, another computer device (such as the measurement information terminal 140, for example) may execute the calculations and transmit the calculation result to the server 160.

As a third stage, "identification", of the processing method, the sensor 110 generates a pulse waveform of a particle of which the type is not known (hereinafter referred to as the "unknown particle"), the measurement instrument 120 amplifies the waveform, and the measurement information terminal 140 extracts features of the waveform. The sensor ID of the sensor 110 and the features of the waveform obtained from the unknown particle are sent together to the server 160 over the network 199. The server 160 may estimate the type of the unknown particle (hereinafter also referred to as the "unknown class") on the basis of the received features, the physical property information of the sensor 110, and the machine learning optimization parameters calculated in the second stage above. In the estimation in the third stage, calculations corresponding to the physical properties of the sensor associated with the sensor ID likewise may be performed.

The estimation result may be transmitted from the server 160 to the measurement information terminal 140 and displayed on a display means included in the measurement information terminal 140, for example.

Here, even if the sensors 100, 101, and 110 are the same product, the physical properties may actually be different from one another in some cases. For example, even if the sensors have the same structure, the electrical characteristics may be slightly different. In the present embodiment, by associating information related to the physical properties of each sensor with the sensor ID and using the information for machine learning and/or unknown class estimation, it is possible to appropriately manage variables that influence the machine learning, such as the physical properties of the sensors, the control parameters of the measurement instrument, and the measurement conditions, making it possible to perform appropriate machine learning and identification of various particles using various sensors and various measurement instruments under various measurement conditions.

Furthermore, according to the configuration described above, an effect of enabling optimal machine learning is obtained even if there is a change in the properties of the measurement instrument 120, such as a change in the properties of an amplifier (amp) or a digitizer for example.

In other words, a system according to an embodiment of the present invention, such as the system according to FIG. 1, exhibits an effect of making it possible to use various sensors and measurement instruments to learn and identify various particles.

Note in FIG. 1, the dashed lines connecting the sensors 100, 101, and 110 to the measurement instrument 120 indicate that the sensors may be connected to the measurement instrument 120 (or the measurement information terminal 140) at the same time or separately for each process.

Figure 2:
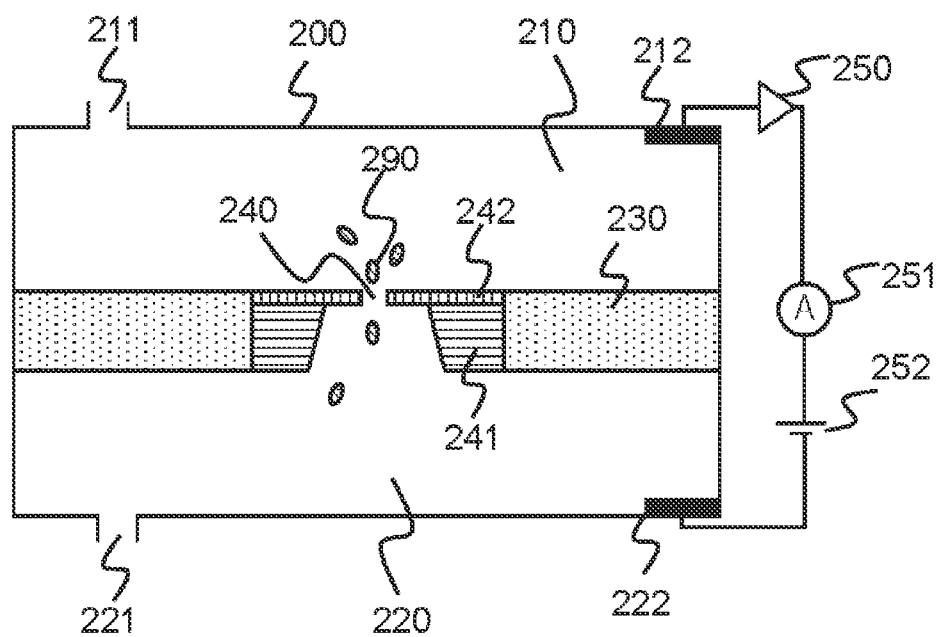
FIG. 2 is a schematic diagram illustrating an internal structure of a sensor according to an embodiment of the present invention.

Next, details of processes according to the present invention will be described. FIG. 2 illustrates the internal structure of an exemplary sensor 200 for particle identification according to an embodiment of the present invention. The sensor 200 here is usable as the sensors 100, 101, and 110 in FIG. 1.

The sensor 200 includes two chambers 210 and 220 divided by a partition 230. The chambers 210 and 220 include electrolytic solution inlets 211 and 221 and electrodes 212 and 222, respectively. The partition 230 is provided with a silicon wafer 241 and a pore 290 formed by processing a thin film (membrane) 242 deposited on the silicon wafer 241.

Also, as illustrated in FIG. 2, a power source 252, an amplifier (amp) 250 and an ammeter 251 may be connected to the electrodes 212 and 222. These devices may be included in a measurement instrument such as the measurement instrument 120 of FIG. 1, for example. Alternatively, in another embodiment, the sensor may include some or all of the above devices. In other embodiments, the sensor structure is not limited to the one illustrated in FIG. 2, and the sensor may have any structure insofar as the sensor is configured to measure transient changes in an ion current when particles to be measured in an electrolytic solution pass through a pore. For example, the shape of the pore 290 may be a circle having a certain diameter, an ellipse having a certain major axis and a certain minor axis, a diamond having edges of a certain length, or some other shape. Note that the direction of the power source 252 and the polarity of the electrodes 212 and 222 illustrated in FIG. 2 are merely one example, and the polarity may also be reversed in another embodiment.

Additionally, an electrolytic solution may be introduced into the chambers 210 and 220. By introducing particles into the electrolytic solution and causing the particles to pass through the pore 290, transient changes in the ion current may be detected by the ammeter 251 (or a measurement instrument or sensor that includes an ammeter). Note that to make FIG. 2 easy to understand, the electrolytic solution inlets 211 and 221 are drawn away from each other, but it is also possible to adopt a structure in which the inlets are near each other or form the same inlet.

Figure 3:
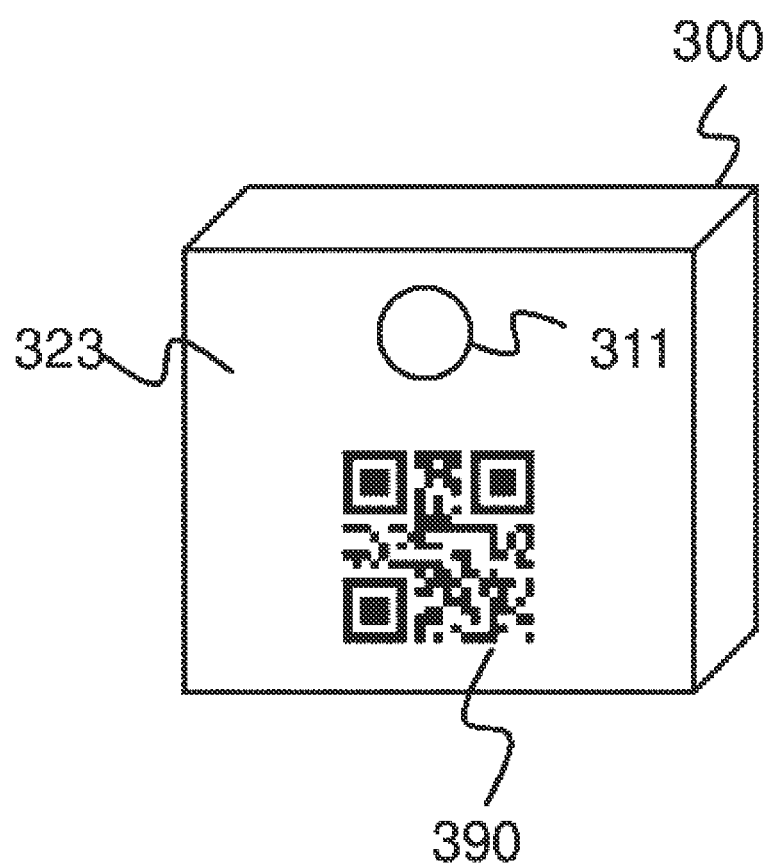
FIG. 3 is a schematic diagram illustrating the appearance of the sensor according to an embodiment of the present invention.

FIG. 3 illustrates the appearance of an exemplary sensor 300 according to an embodiment of the present invention. The sensor 300 is usable as the sensors described above. The sensor 300 has a rectangular cuboid shape and includes an electrolytic solution inlet 311 and a sensor ID (unique identifier) presentation means 390 on one face 323 thereof. The present embodiment is configured such that when an electrolytic solution is injected from the electrolytic solution inlet 311, a plurality of chambers (not illustrated) inside the sensor 300 may be filled with the electrolytic solution. The sensor ID is an identifier unique to each sensor, and preferably is assigned by the sensor manufacturer or the sensor provider (seller) from a management perspective. In another embodiment, it is also possible for the user to assign the sensor ID.

Also, in the present embodiment, the presentation means 390 is a two-dimensional barcode (QR Code®), and the sensor ID is optically detectable by using a reading means (such as a mobile terminal such as a smartphone or a tablet, or a stationary terminal such as a desktop PC, that includes QR code reading software and an imaging means, for example). In another embodiment, any means may be used as the presentation means 390 insofar as the sensor ID is presentable by optical, visual, acoustical, or electromagnetic technology for example, and a one-dimensional or three-dimensional barcode, printed material containing characters (such as numerals and symbols) or an image, a physical impression, an audio storage and output device, a magnetic storage and output device, an electrical storage and output device (such as a semiconductor memory), or an electromagnetic wave carrying means (such as wireless communication equipment) is usable, for example. Such presentation means may detect the sensor ID by using a respectively corresponding reading means (such as a barcode scanner/reader, a camera, a microphone, or an antenna for receiving electromagnetic waves, for example). In other words, the presentation means 390 does not need to be exposed on the outside of the sensor 300, and may also be stored inside the sensor 300 insofar as the sensor ID is presentable by some kind of technology.

For example, in an embodiment, a two-dimensional barcode may be printed or impressed onto a different material from the sensor 300, and the different material may be affixed to the sensor 300. Also, as described later in relation to FIGS. 20 and 21, a configuration enabling the reading of a sensor ID stored in a semiconductor memory may also be adopted.

Moreover, the position and number of the electrolytic solution inlet 311 and the presentation means 390 in FIG. 3 are merely an example, and any number of electrolytic solution inlets 311 and presentation means 390 may be arranged at any positions insofar as the functionality of the sensor 300 not impaired. In another different embodiment, the shape of the sensor 300 is not limited to a rectangular cuboid, and any shape such as a sphere, a cube, a triangular pyramid, or a cone for example may be adopted. For example, the sensors 100, 101, and 110 in FIG. 1 described above may have respectively different sensor IDs, such that each sensor is specifiable by the sensor ID. In other words, by adopting the configuration according to an embodiment of the present invention like the one illustrated in FIG. 3, an association between a sensor and a sensor ID is possible.

Figure 4:
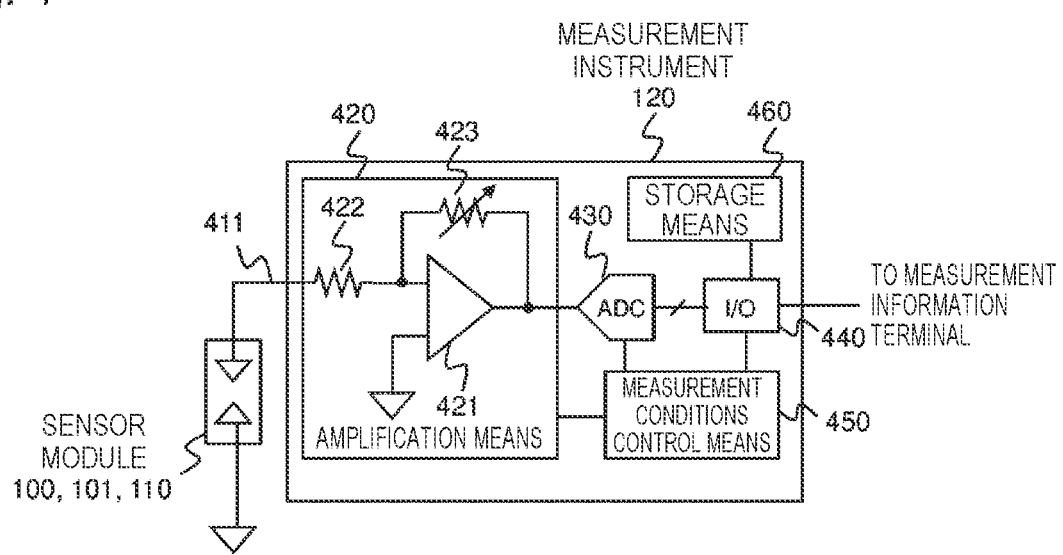
FIG. 4 is a diagram illustrating a connection configuration of a sensor and a measurement instrument according to an embodiment of the present invention.

FIG. 4 illustrates a connection configuration of a sensor and a measurement instrument according to an embodiment of the present invention. In FIG. 4, the sensors 100, 101, and 110 illustrated in FIG. 1 are illustrated collectively for simplicity, and the sensors are assumed to be connected via an input/output means 411 (such as an analog input/output) of the measurement instrument 120.

The measurement instrument 120 in FIG. 4 includes an amplification means 420, an A/D conversion means 430, a measurement instrument (measurement conditions) control means 450, and a storage means 460. The amplification means 420 may include an operational amplifier 421, a resistor 422, and a feedback resistor 423. The measurement instrument 120 may also connect to a measurement information terminal (not illustrated) through an input/output means 440 (such as a digital input/output). In another embodiment, the measurement instrument may also include components other than the above, and unneeded components may also be omitted.

The transient changes in the ion current (current signal waveform) from the sensor are assumed to be supplied to the measurement instrument 120 through the input/output means 411 as an analog input signal. The input signal enters the amplification means 420 and is amplified, is passed to the A/D conversion means 430 and converted to a digital signal, and may be transmitted from the input/output means (I/O) 440 to a measurement information terminal (not illustrated).

The measurement instrument control means 450 may control various parameters related to amplification and A/D conversion with respect to the measurement instrument 120. For example, the measurement instrument control means 450 may control the amplification factor and band of the amplification means 420 by varying the value of the feedback resistor 423 included in the amplification means 420. Note that the feedback resistor 423 is a variable resistor in FIG. 4, but in another embodiment, resistors having different resistance values may be arranged in parallel and the feedback resistance value may be varied by switching between the resistors, or the amplification factor may be varied according to another method.

Also, the measurement instrument control means 450 may control the sampling rate of the A/D conversion means 430. In another embodiment, the measurement instrument control means 450 may also control any other parameters related to the amplification means 420 and the A/D conversion means 430.

Also, the storage means 460 may store a measurement instrument ID that uniquely specifies the measurement instrument 120 (referred to as a unique identifier having a function of uniquely identifying each measurement instrument). The measurement instrument ID is readable by a measurement information terminal or another computer device through the input/output means 440, for example. With this arrangement, an external computer device may uniquely specify the measurement instrument 120.

In another embodiment, the circuit configuration of the measurement instrument is not limited to the example of FIG. 4 and may have any circuit configuration with which the output from a sensor may be received and outputted to an information terminal as a signal (such as a digital signal). For example, the measurement instrument may also include a configuration in which an amplification means and an A/D conversion means are included in respectively different devices and the plurality of devices are interconnected. Alternatively, as another embodiment, the amplification means 420 may be built into a sensor (for example, the sensors 100, 101, and 110) while the A/D conversion means 430 may be included in the measurement instrument 120. Also, another embodiment may be configured such that both the amplification means 420 and the A/D conversion means 430 are built into a sensor, and a digital signal is outputted directly from the sensor. The output from the A/D conversion means 430 may be in any data format, and the interface of the input/output means 440 may be a serial interface or a parallel interface.

Figure 5:
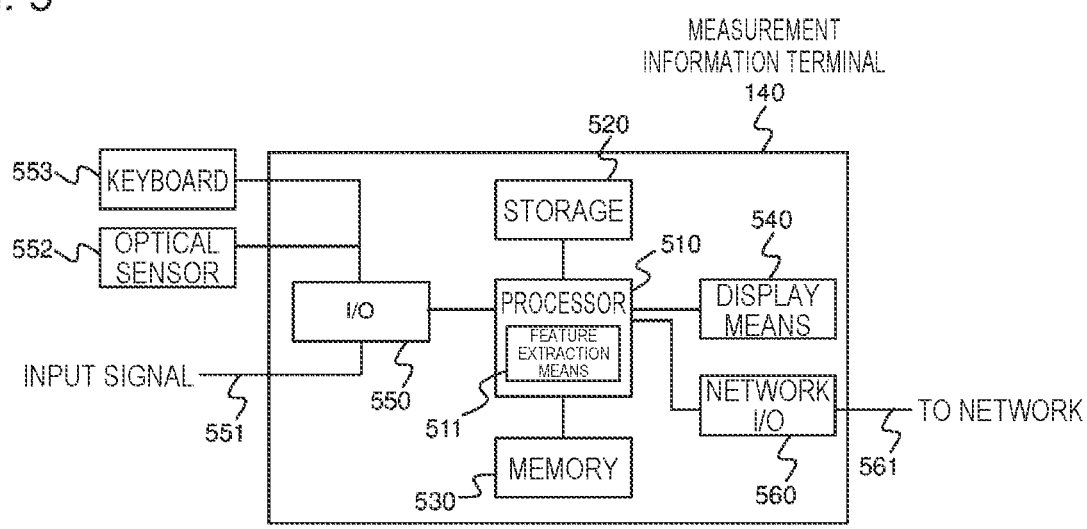
FIG. 5 is a diagram illustrating a configuration of a measurement information terminal according to an embodiment of the present invention.

FIG. 5 illustrates a configuration of an exemplary measurement information terminal 140 according to an embodiment of the present invention. In the example of FIG. 5, the measurement information terminal 140 includes a processing means (processor) 510, a main storage means (for example, non-volatile storage) 520, a memory (such as volatile memory) 530, a display means (such as a visual display and a speaker) 540, an input/output means 550, and a network input/output means 560. A digital signal output from the sensor or the measurement instrument described above may be inputted into the input/output means 550. An optical sensor 552 such as a barcode reader may be connected to the input/output means 550, for example. A mechanical input means such as a keyboard 553 and a mouse may also be connected to the input/output means 550. Examples of non-volatile storage include an SSD and a hard disk, and a physically standalone device or a group of a plurality of devices may be used in combination. Note that a computer device other than the measurement information terminal 140 may also have the same or similar components to the measurement information terminal 140.

The processing means 510 may read out a feature quantity extraction means 511 from the storage 520 or another external storage means, and place the feature quantity extraction means 511 in the memory 530 for execution. The feature quantity extraction means 511 may be software (or a program) capable of extracting features from a waveform expressed by an input signal (i.e., a waveform expressing transient changes in an ion current and outputted from a sensor).

Also, the measurement information terminal 140 may be connected to a server (such as the server 160 in FIG. 1) over a network (such as the network 199 in FIG. 1) through the network input/output means 560. In another embodiment, a feature quantity extraction means may be read out from a server such as the server 160 and executed by the measurement information terminal 140. Furthermore, in another embodiment, the measurement information terminal 140 may not extract features, and instead another computer device such as the server 160 may receive the output from the measurement information terminal 140 and execute the feature quantity extraction means 511 to extract features.

Figure 6:
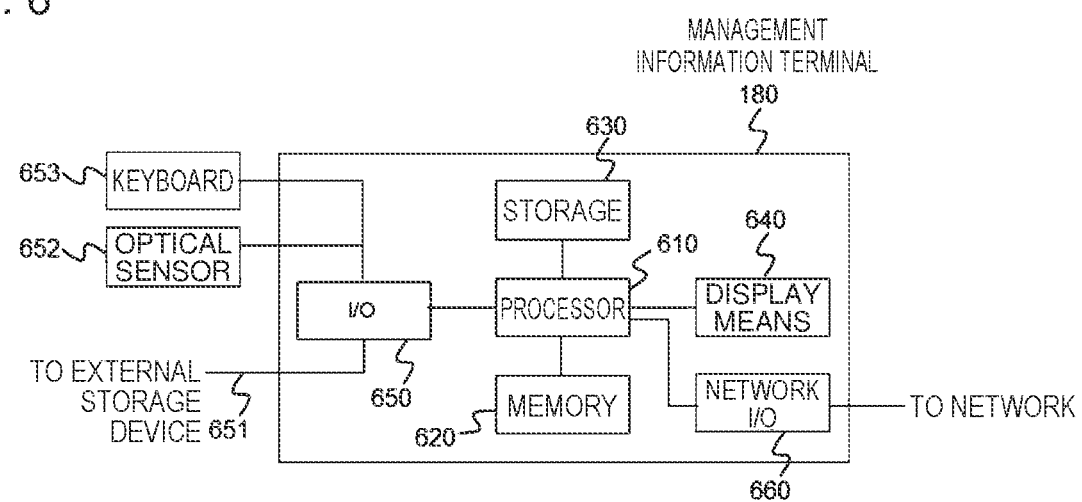
FIG. 6 is a diagram illustrating a configuration of a management information terminal according to an embodiment of the present invention.

FIG. 6 illustrates a configuration of an exemplary management information terminal 180 according to an embodiment of the present invention. The configuration is similar to the measurement information terminal 140 illustrated by way of example in FIG. 5, and therefore the description is reduced or omitted. The management information terminal 180 may be connected to an external device or a network, and may acquire a sensor ID (a unique identifier related to a sensor) and information related to the physical properties of the sensor (which may include information related to a product number of the sensor, or in other words a sensor model ID) through a keyboard 653, an optical sensor 652, a connection 651 to an external storage device, or the like. The above information may also be transmitted to an external server (such as the server 160) through a network input/output means 660 and a network (such as the network 199). With this arrangement, the management information terminal 180 may manage information about a sensor and a measurement instrument used to identify particles. Note that in the present specification, the "model ID" may also be thought of as referring to a model number.

In another embodiment, the measurement information terminal 140 and the management information terminal 180 each may include a plurality of computer devices. In yet another embodiment, a single computer device may function as both the measurement information terminal 140 and the management information terminal 180.

Figure 7:
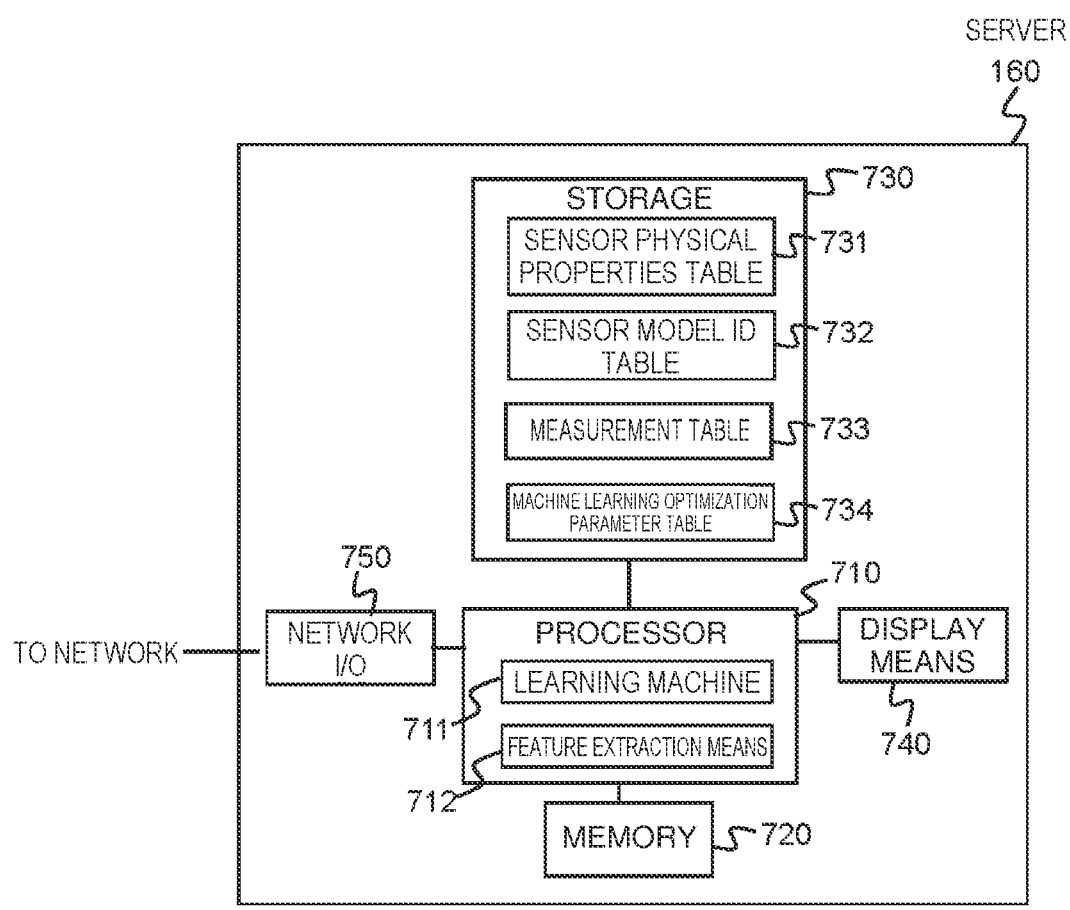
FIG. 7 illustrates a configuration of a server according to an embodiment of the present invention.

FIG. 7 illustrates a configuration of an exemplary server 160 according to an embodiment of the present invention. The server 160 may include a processing means (processor) 710, a main storage means (storage) 730, a memory (such as volatile memory) 720, a display means 740, and a network input/output means 750. The above components may be similar to those of the measurement information terminal 140 in FIG. 5. In another embodiment, the server 160 may also be a headless server not provided with a display means.

The storage 730 in FIG. 7 may store a physical properties table 731, a sensor model ID table 732, a measurement table 733, and a machine learning optimization parameter table 734. The above tables are usable by being read out by the processor 710 and placed in the memory 720. It should be noted that although only "tables" are indicated for simplicity in the present example, such table functionality may also be achieved by a database of any type (such as an SQL database or Microsoft Access) used in the relevant technical field.

Examples of the physical properties table 731 and the sensor model ID table 732 are illustrated in FIGS. 8 and 9, respectively. Also, the measurement table 733 and the machine learning optimization table 734 are illustrated in FIGS. 14 and 16, respectively (described in detail later).

In the embodiment of FIG. 7, the measurement information terminal 140 does not perform the feature quantity extraction, but rather the measurement information terminal 140 may send a signal expressing a waveform to the server 160, the server 160 may extract features using a feature quantity extraction means 712, and a learning machine 711 may learn the features. In another embodiment, the learning machine 711 in the server 160 may learn by using features obtained from another computer device such as the measurement information terminal 140.

First Stage: Preparation of Data Related to Physical Properties of Sensors

Figure 10:
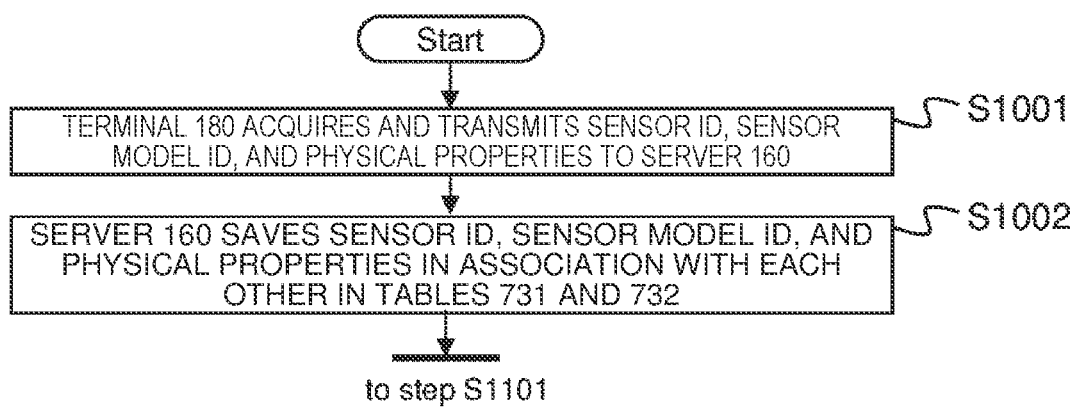
FIG. 10 is a flowchart for explaining an example of a first stage of a processing method according to an embodiment of the present invention.

The first stage of the above processing method according to an embodiment of the present invention will be described in detail with reference to FIG. 10 and FIGS. 8 and 9. First, the management information terminal 180 acquires the sensor ID of each of the sensors 100, 101, and 110 and information related to the physical properties of the sensors (which may include a sensor model ID) as described above. It should be noted that in the present example, for simplicity, sensors having the same sensor model ID are assumed to have the same physical properties. Thereafter, the network input/output means 660 sends each of the sensor IDs (or sensor model IDs) in association with the physical property information to the server 160 over a network (such as the network 199) (step S1001).

The server 160 stores the sensor IDs and the sensor model IDs in association with each other in the sensor model ID table 732, and also stores the sensor model IDs and the physical property information in association with each other in the physical properties table 731 (step S1002). After that, the flow proceeds to step S1101 of FIG. 11 described later.

FIG. 8 is an example of the physical properties table 731. The physical properties table 731 includes a sensor model ID column 810 and corresponding columns 820 to 880 of information expressing various physical properties of each sensor.

In the example of FIG. 8, the column 820 expresses the diameter of the pore 290 included in the sensor, the column 830 expresses the thickness of the membrane (or thin film) 242, the column 840 expresses the material of the membrane 242, the column 850 expresses a sensor structure number (for example, a sign for specifying information about the structure like the one illustrated in FIG. 2, but not limited thereto), the column 860 expresses the material of the electrodes 212 and 222, the column 870 expresses the sensor capacitance (in the example of FIG. 8, expressed as the capacitance between the electrodes 212 and 222 when 1×PBS buffer solution (1 mol % phosphate-buffered saline) is introduced into the chambers 210 and 220 and the pore 290, but not limited thereto), and the column 880 expresses a surface treatment of the pore 290 (such as surface modification by plasma, hydrophilic material application, and molecular modification, for example). In addition, information specifying a variable type and units may be included in each column, and for example, the variable type/unit information 821 in the column 820 indicates that the variable type is integer (int) and the units are nm. Also, the variable type/unit information 881 in the column 880 indicates that the variable type is string and there are no units.

In the example of FIG. 8, for instance, physical properties are stored to indicate that a sensor "X003001" with the model ID 813 has a pore diameter of 300 nm, a membrane thickness of 50 nm, a membrane material of silicon nitride (SiN), a sensor structure denoted by the sign "B2", an electrode material of silver/silver chloride (Ag/AgCl), a capacitance of 29 pF, and a dopamine-based pore surface treatment.

FIG. 9 is an example of the sensor model ID table 732. The sensor model ID table 732 includes a column 910 expressing the sensor ID and a column 920 expressing the sensor model ID. In the example of FIG. 9, for instance, the sensor ID 911 and the sensor model ID 921 are stored in association with each other. In the example of FIG. 9, for instance, the sensors respectively associated with the sensor IDs 911 to 913 correspond to the same model IDs 921 to 923, namely "X001001". The above indicates that the sensors respectively associated with the sensor IDs 911 to 913 all have the same physical properties expressed in row 811 of FIG. 8. On the other hand, the sensor "X001001" corresponding to each of the sensor IDs 911 to 913 is a different sensor model ID from the sensor "X002001" corresponding to the sensor ID 914, which indicates that the sensors corresponding to the sensor IDs 911 to 913 and the sensor corresponding to the sensor ID 914 have different physical properties.

As described above, the server 160 may store associations between each sensor and its physical properties in the physical properties table 731 and the sensor model ID table 732. In other words, the above configuration means that the sensor ID and the physical properties of the corresponding sensor are associated with each other (indirectly through the sensor model ID). In another embodiment, the sensor ID and the physical properties of each sensor may also be associated directly, without using the sensor model ID. In other words, each sensor, the sensor ID, and the detailed physical properties may also be associated with each other directly in a sensor physical properties table without relying on the product number of the sensor (sensor model ID) and without using the sensor model ID table. That is to say, the sensor physical properties table and the sensor model ID table may be combined.

Such a feature makes it possible to appropriately manage different machine learning optimization parameters for each physical property of the sensors as preconditions for machine learning, and achieve a highly versatile machine learning particle identification system.

Note that the physical properties illustrated in FIG. 8 are merely an example, and any other physical properties may be included insofar as the information expresses the characteristics or nature of the sensors. In another embodiment, information about the Si chip used as the silicon wafer 241 and the membrane 242 in FIG. 2, such as a manufacturer number, a fabrication plant number, a lot number, on-wafer coordinate information, a date of manufacture, an Si device structure, a wafer material, information about the fabrication process such as a cleaning step, a shipping standard, information related to process inconsistencies, and test results may also be considered to be information related to the physical properties of a sensor in the present specification. Also, information such as information related to sensor fabrication steps, such as the structure of the chambers 210 and 220, the material of the chamber wall surface, a chamber wall surface treatment, an electrode structure, an electrode material, a temperature history during the fabrication steps, a quality standard, the capacitance when an electrolytic solution is introduced, the resistance, the inductance, and quality information obtained from sampling inspection may also be considered to be information related to the physical properties of a sensor in the present specification. Storing information related to the fabrication of sensors in this way makes it possible to compare machine learning performance evaluations using the sensors and also improve the quality of the sensors.

Second Stage: Learning Process

Next, the second stage of the processing method according to an embodiment of the present invention will be described in detail with reference to FIGS. 11 to 16.

Figure 11:
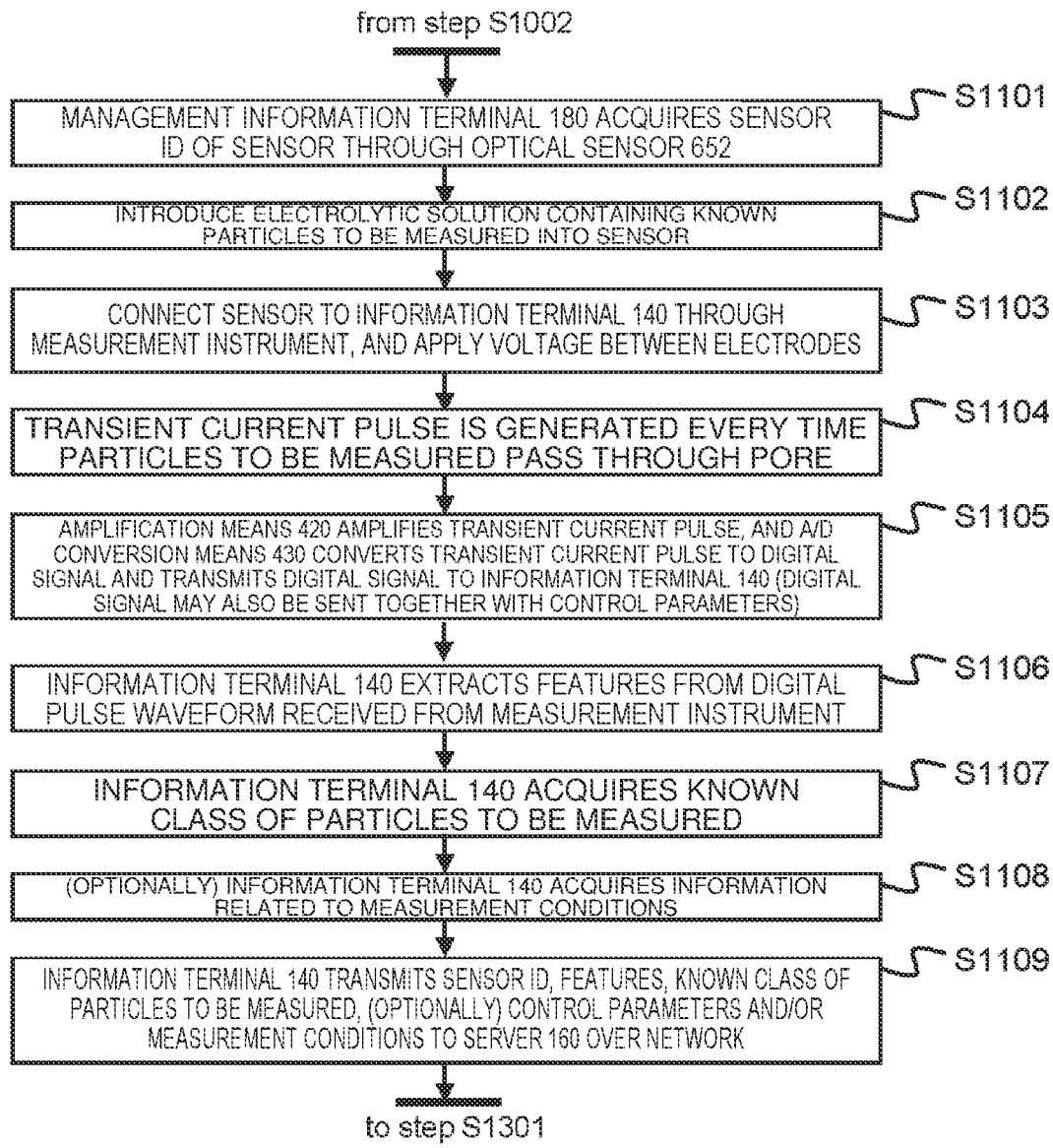
FIG. 11 is a flowchart for explaining an example of a second stage of a processing method according to an embodiment of the present invention.

FIG. 11 illustrates a flowchart for explaining the first half of a learning process according to the second stage. First, an optical sensor in the management information terminal 180 (or another computer device such as the measurement information terminal 140) is used to read and acquire the sensor ID as described above from the presentation means included in a sensor (step S1101). At this time, the sensor ID may be acquired by causing the optical sensor 652 of the management information terminal (or another sensor such as the optical sensor 552 of the measurement information terminal) to read the two-dimensional barcode 390 in FIG. 3 attached to the sensor, for example, or the sensor ID read by some kind of means may be inputted from the keyboard 653 (or another input means such as the keyboard 553). Alternatively, the measurement information terminal or the management information terminal may read the sensor ID electrically from a sensor module including a semiconductor memory and configured to allow the sensor ID to be read electrically, or the sensor ID may be read by some other method.

Next, either or both of the chambers 210 and 220 are filled with an electrolytic solution containing particles of a known type to be measured (that is, known particles) in step S1102. When introducing the electrolytic solution, any device (such as a cannula, a pump, or a dropper) may be used to inject the electrolytic solution into the electrolytic solution inlet.

Additionally, for example, if the sensor is connected to the measurement information terminal 140 through the measurement instrument 120 like the configuration illustrated by way of example in FIG. 1 or FIG. 4, the measurement instrument 120 applies a voltage between the electrode 212 and the electrode 222 in step S1103. This arrangement causes an ion current to flow between the electrode 212 and the electrode 222.

Thereafter, the charged particles to be measured pass through the pore 290. At this time, the electrolytic solution near the pore 290 is repulsed by the particles to be measured that pass through, and as a result, a transient decrease in the ion current is generated and observed (as a pulse waveform, for example) every time the particles pass through the pore 290 in step S1104.

Figure 12:
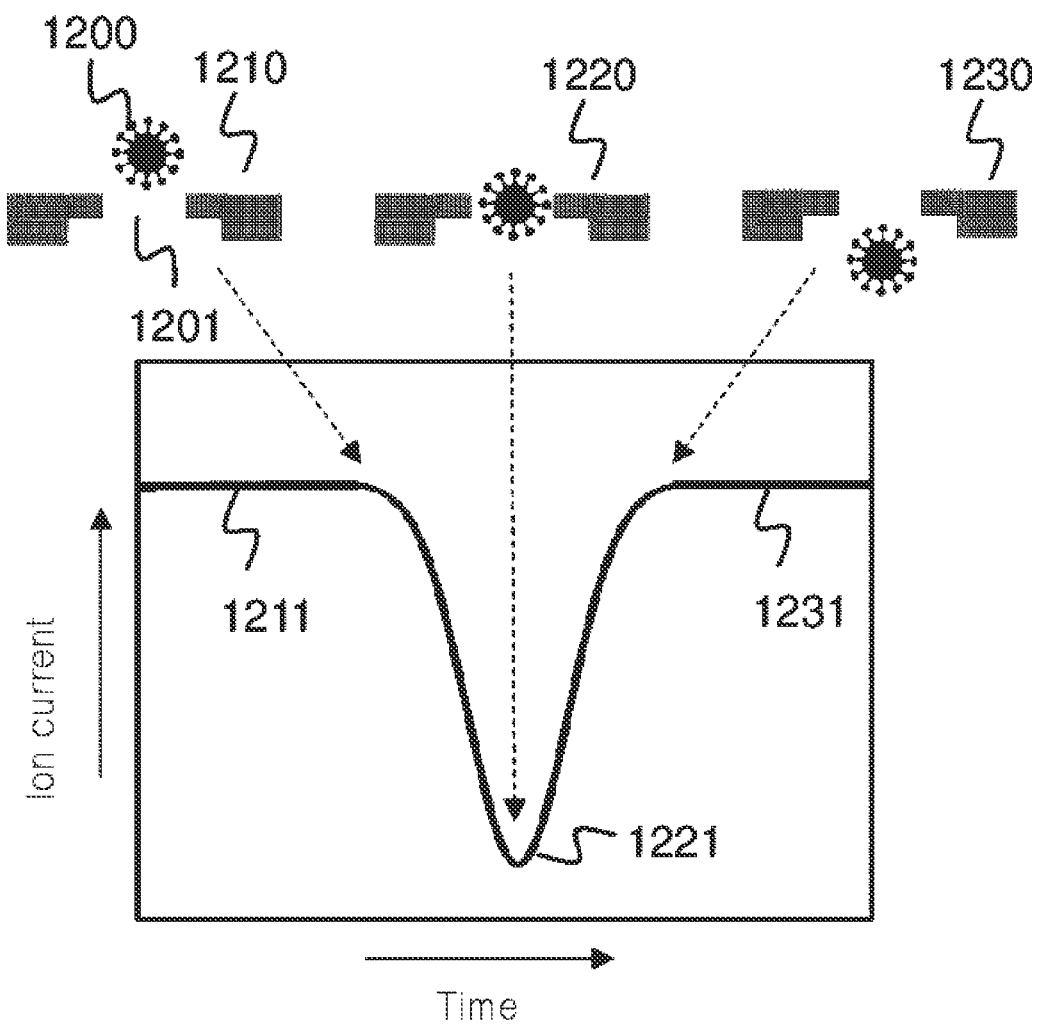
FIG. 12 is a diagram for schematically explaining an example of transient changes in an ion current flowing between electrodes when a particle passes through a pore.

FIG. 12 schematically illustrates an example of transient changes in the ion current flowing between the electrode 212 and the electrode 222 when a particle passes through a pore. The present example assumes that a particle 1200 passes through a pore 1201. In the graph of the ion current waveform, the vertical axis is the ion current value (Ion current) and the horizontal axis is the elapsed time (Time).

First, a first state 1210 is the state before the particle 1200 passes through the pore 1201. The ion current waveform 1211 at this time is a steady (constant) value.

Also, a second state 1220 is the state while the particle 1200 is passing through the pore 1201. Ions inside the pore 1201 are repulsed by the particle 1200, and therefore the current value drops in the ion current waveform 1221 at this time. In other words, a pulse waveform is obtained.

Also, a third state 1230 is the state after the particle 1200 has passed through the pore 1201. The ion current waveform 1231 at this time returns to a steady (constant) value. In this way, a transient current pulse is generated and consequently is observable by a measurement instrument or a measurement information terminal.

Returning to FIG. 11, in step S1105, the amplification means (amp) 420 of the measurement instrument 120 amplifies the tiny current signal observed in the previous step S1104. The amplified signal may be converted to a digital signal by the A/D conversion means 430. In the example of FIG. 4 as described above, the measurement instrument control means 450 may manipulate various parameters related to the amplification and digitization of the signal, and thereby control the amplification means 420 and the A/D conversion means 430. The parameters related to the above control may include parameters such as the amplification factor of the amplification means and the bit depth and sampling rate of digitization, for example, and furthermore may include any other control parameters related to amplification and digitization.

Thereafter, the input/output (I/O) means 440 sends the pulse waveform data output from the A/D conversion means 430 to the measurement information terminal 140 at step S110. In an embodiment, the control parameters described above that are used by the measurement instrument control means 450 may also be sent from the input/output means (I/O) 440 to the measurement information terminal 140. Furthermore, a measurement instrument ID for uniquely specifying the measurement instrument 120 may also be acquired from the storage means 460 or the like and sent to the measurement information terminal 140 together with the pulse waveform data and the control parameters.

Next, the measurement information terminal 140 uses the feature quantity extraction means 511 to extract (one or more types of) feature quantities to be used for machine learning from the received pulse waveform data at step S1106. The feature quantities extracted at this point may include information such as the peak height, the peak width, the pulse area, the degree of symmetry in the pulse waveform (a parameter expressing symmetry) for each pulse, and furthermore may also include any quantity that expresses a characteristic of the pulse waveform. In another embodiment, the feature quantity extraction may also be performed by another computer device (such as the server 160).

Next, the measurement information terminal 140 may receive information related to a known class expressing the type of the known particles that were measured in step S1104 through the keyboard 553, the optical sensor 552, the I/O 550, or the like, and store the received information in a storage means (such as the storage 520 or the memory 530) at step S1107.

Thereafter, the measurement information terminal 140 may acquire measurement condition information related to the measurement and amplification in some or all of steps S1101 to S1105 through the keyboard 553, the optical sensor 552, the network I/O 560, or the like, and store the acquired measurement condition information in a storage means (such as the storage 520 or the memory 530) at step S1108. Examples of such measurement condition information include the type of electrolytic solution used for measurement, the salt concentration of the electrolytic solution, the type of equipment used when installing the sensor module in the measurement instrument, and the like, but the measurement condition information is not limited to the above. Additionally, the control parameters described above may also be considered to be included in the measurement condition information.

Also, in an embodiment, instead of acquiring control parameter information such as the sampling rate of the measurement instrument 120 used in step S1105, the number of bits used during digitization, and circuit parameters of the amplification circuit included in the amplification means, the measurement information terminal 140 may acquire control parameter information through the keyboard 553, the optical sensor 552, the I/O 550, the network I/O 560, or the like in step S1108, and store the acquired control parameter information in a storage means. In other words, step S1108 is an additional, optional step.

The measurement conditions described above may influence the shape of the measured pulse waveform, and consequently may be used as preconditions when performing machine learning. Note that in the example illustrated in FIG. 11, the measurement information terminal 140 receives the known class information and the measurement condition information after step S1106, but in another embodiment, the measurement information terminal 140 may receive the known class information and the measurement condition information at any time.

Next, the measurement information terminal 140 sends at least a portion of the sensor ID received in step S1101, the features extracted (or calculated) in step S1106, the control parameters received in step S1105, the known class received in step S1107, and the measurement conditions received in step S1108 to the server 160 from the network input/output (transmission/reception) means 560 over a network (such as the network 199) at step S1109. After that, the flow proceeds to step S1301 of FIG. 13 described later.

Figure 13:
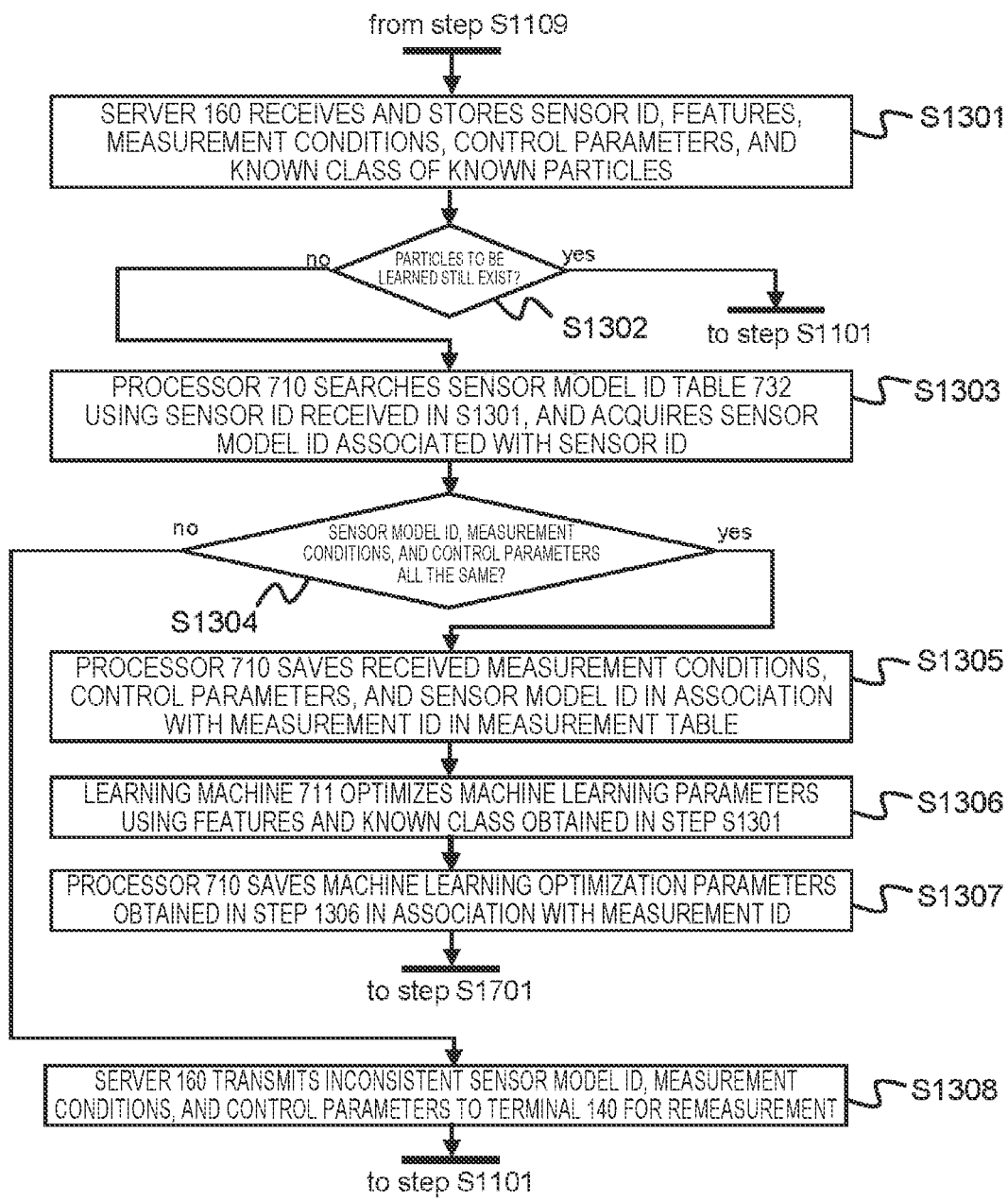
FIG. 13 is a flowchart for explaining an example of a second stage of a processing method according to an embodiment of the present invention.

FIG. 13 illustrates a flowchart for explaining the second half of the learning process according to the second stage. First, the server 160 receives at least a portion of the sensor ID, the features, the control parameters, the known class, and the measurement conditions sent from the measurement information terminal 140 in step S1109, and stores the received information in a storage means (such as the storage 730 or the memory 720) at step S1301.

In this example, for simplicity, the objective of the machine learning is assumed to be the identification of particles from among the three types of A1, A2, and A3. In this case, the server 160 repeatedly performs steps S1101 to S1301 until learning is finished for the known particles to be learned (in other words, in this example, all of A1, A2, and A3). Additionally, for each of the known particles, the server 160 receives at least a portion of the measured sensor ID, features, measurement conditions, control parameters, and known class at step S1302.

Next, the processor (processing means) 710 searches the sensor model ID table 732 by using all of the received sensor IDs as keys at step S1303. This arrangement makes it possible to specify what kinds of physical properties are exhibited by the sensor that measured the information such as the features received in step S1301.

Next, the server 160 determines whether the sensor model ID, the measurement conditions, and the control parameters are consistent with each other for all measurements of the particles A1 to A3 (step S1304). If all of the above are consistent with each other, the flow proceeds to step S1305, and otherwise the flow proceeds to step S1308.

In step S1305, the processor 710 of the server 160 may store the measurement conditions, the control parameters, and the sensor model ID determined to be consistent with each other in step S1303 in association with a measurement ID in the measurement table 733. Note that the "measurement ID" referred to herein is a unique identifier for each measurement, and has a function of uniquely specifying each measurement. Also, the set of information to be associated with the measurement ID above is merely an example, and it is also possible to associate a set of other information as described above with the measurement ID.

In other words, in the present embodiment, the measurement ID may be used to specify a pulse waveform, that is, a set of conditions that influence the machine learning optimization parameters.

FIG. 14 illustrates an exemplary measurement conditions table 733 according to an embodiment of the present invention. The measurement table 733 may store measurement IDs in a column 1400 with respect to rows 1401, 1402, 1403, 1404, and so on. Additionally, the information indicated in columns 1410 to 1490 is an example of the measurement conditions stored in association with each of the measurement IDs. As illustrated in the table, each column also includes information defining a variable type such as string, float (floating-point number), or int, and the units of quantity.

Information expressing the type of known particle to be measured is stored in the column 1410, the sensor ID is stored in the column 1420, the type of buffer solution (electrolytic solution) is stored in the column 1430, the concentration of the buffer solution (in this example, indicated as the dilution ratio of a 1× solution) is stored in the column 1440, a measurement instrument model number is stored in the column 1450, a model number of the equipment connecting the sensor and the measurement instrument is stored in the column 1460, the bit depth used when digitizing the pulse waveform in the measurement instrument is stored in the column 1470, the amplification factor of the amp is stored in the column 1480, and the sampling rate of the pulse waveform is stored in the column 1490.

Note that the information illustrated in FIG. 14 is merely an example and may be added or changed freely. For example, the measurement instrument ID described above may be used instead of the measurement instrument model number in the column 1450.

In the example of FIG. 14, the measurement specified by the measurement ID "235071" stored in the row 1401 indicates that all three types of known particles A1, A2, and A3 were measured using the sensor with the sensor model ID "X001001", the particles to be identified were introduced into PBS (phosphate-buffered saline) diluted to 0.5, the measurement was perform by connecting the sensor to the measurement instrument with the model number "AT-1000" through equipment with the model number "BC-1", and pulse waveform information was generated by digitizing an analog signal amplified by an amplification factor of $10^8$ (10 to the 8th power) at a sampling rate of 250 kHz and a bit depth of 12 bits. Such a configuration demonstrates an effect of making it easy to acquire teaching data with consistent conditions.

Note that in FIG. 14, the information stored in the row 1404 differs from the row 1401 in that the measurement ID is different and the known class field is empty. The above indicates that the measurement with the measurement ID "235074" is incomplete, and is being performed under the same conditions as the measurement ID "235071".

In an embodiment, in the case where the sensor that performed the measurement with the measurement ID "235071" and the sensor performing the measurement with the measurement ID "235074" have the same model number but are physically distinct units, it is possible to notify (the user of) the sensor performing the measurement with the measurement ID "235074" about information such as the measurement conditions used for the measurement with the measurement ID "235071." In other words, at least a portion of the information stored in the row 1401.

For example, information such as the measurement conditions may be transmitted from the server 160 to an information terminal (a measurement information terminal or some other terminal) possessed by the user of the sensor performing the measurement with the measurement ID "235074" on the basis of the measurement table 733, and the user of the information terminal may be notified (through a display means or the like).

In another embodiment, a request to measure particles belonging to a certain known class may be send to the server 160 from the user possessing a measurement instrument specified by a certain measurement instrument ID. In this case, the server 160 may search the measurement table 733 for past measurement results, obtain information about a record of measurement of the particles belonging to the known class, and notify the user of appropriate measurement conditions and the sensor model ID. Obviously, the user may also be notified of other information from the server 160, and for example, the user may also be notified of information such as machine learning optimization parameters and measurement instrument control parameters usable for particle identification. In other words, the server 160 is capable of appropriately providing some kind of information usable for particle identification to a user performing particle identification. Alternatively, in another embodiment, the configuration of some or all of the sensor, the measurement instrument, the measurement information terminal, and the management information terminal may be edited in hardware or in software on the basis of information included in a notification like the above, such that the measurement conditions of the sensor and/or the measurement instrument are adjusted automatically.

By notifying the user of measurement conditions for measuring (learning) known particles, the configuration described above demonstrates an effect of enabling the user to learn with certainty, and furthermore demonstrates an effect of enabling the automatic configuration of settings in the amp and digitizer for measuring known particles.

Returning to FIG. 13, the learning machine 711 of the server 160 may learn by using the features received in S1301 as training data and the known class information as teaching data at step S1306. Here, learning (machine learning) refers to a process of optimizing machine learning parameters such that an output result from a machine learning model included in the learning machine 711 has the highest probability of being the known class received in step S1301.

Parameters optimized in this way are also referred to as "machine learning optimization parameters". The learning machine 711 is a software means for computing machine learning optimization parameters from given features and teaching data. The algorithm used by the learning machine 711 may be any type of algorithm, such as deep learning, regression, a decision tree, a k-nearest neighbor algorithm, or a support vector machine, for example.

Figure 15:
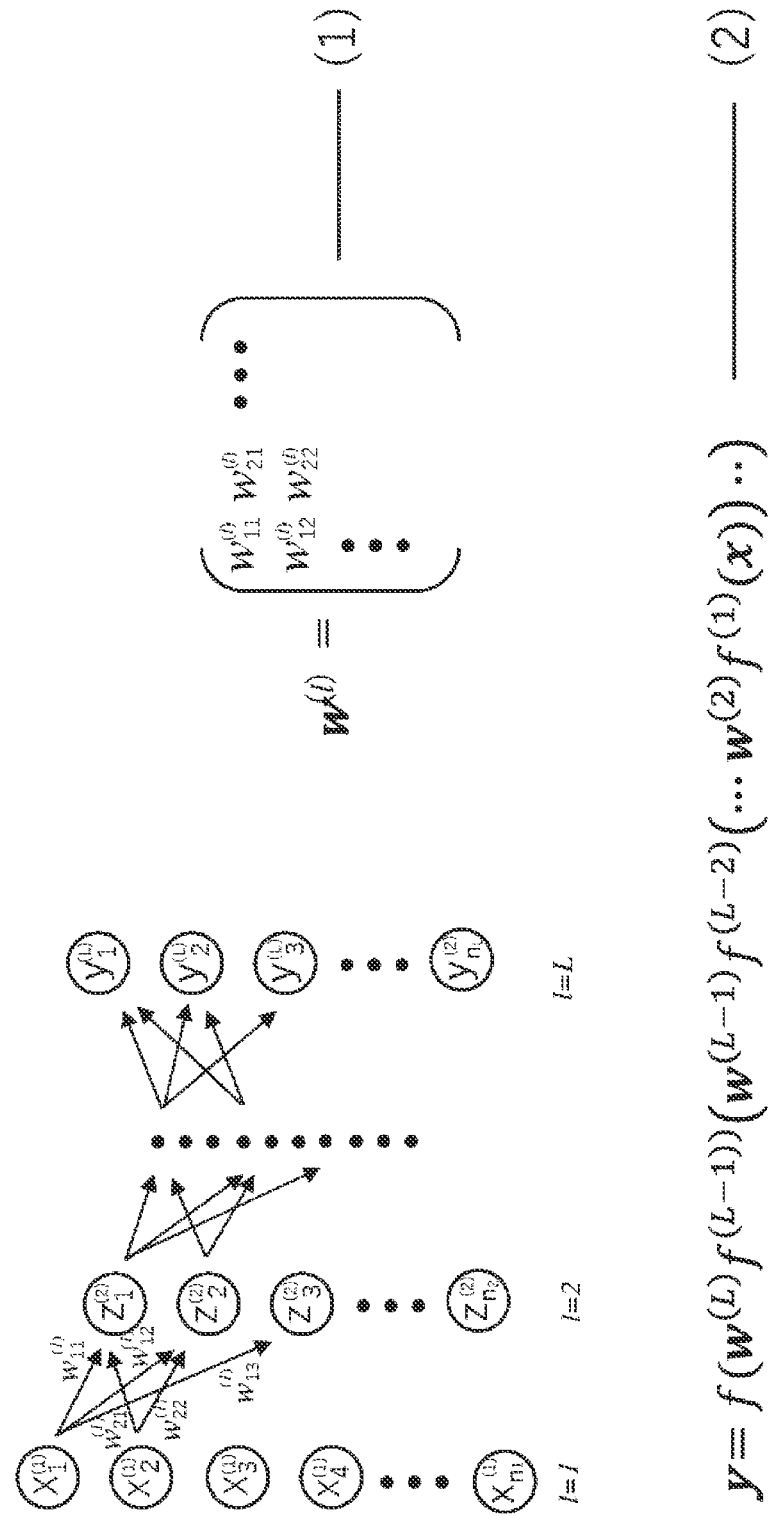
FIG. 15 illustrates an example of a machine learning model using deep learning.

FIG. 15 illustrates an example of a machine learning model using deep learning in order to describe the basic principle of the present invention. In the example of FIG. 15, parameters $$w^{(l)}$$ [Formula 1]

are optimized with respect to the input of training data x into an input layer l=1 such that an error function E(w) defined by the output y of the model and the teaching data t is minimized for an output layer l=L. Here, f(l) is the activation function of each layer, and the parameters to be optimized may be not only the transfer coefficients $$w^{(l)}$$ [Formula 2]

but also other parameters included in the machine learning model, such as parameters included in the activation function, for instance. In another embodiment, any machine learning model other than deep learning may be used.

Thereafter, the processor 710 may save the machine learning optimization parameters and the known class information in association with the measurement ID in the machine learning optimization parameter table 734 at step S1307. After that, the flow proceeds to step S1701 of FIG. 17 described later.

FIG. 16 illustrates an example of the machine learning optimization table 734. In FIG. 16, measurement IDs are stored in a column 1610, and respective elements of the machine learning parameters $$w^{(l)}$$ [Formula 3]

may be stored in columns 1620, 1630, 1640, and so on in association with each measurement ID. Note that although FIG. 16 illustrates an example of the transfer coefficients $$w_{11}^{(1)}, w_{12}^{(1)}, w_{13}^{(1)}$$ [Formula 4]

only, it should be understood that in the example of FIG. 15 for instance, there are $$n_1 \times n_2$$ [Formula 5]

transfer coefficients for the first layer (l=1), $$n_2 \times n_3$$ [Formula 6]

transfer coefficients for the second layer (l=2), and $$n_{L-1} \times n_L$$ [Formula 7]

transfer coefficient for the Lth layer. In the example of FIG. 16, in the row 1611, machine learning optimization parameters calculated according to the features and the known class are stored in association with the measurement ID "235071". The above is a detailed description of an example of the learning process according to the present embodiment.

Note that in step S1304, in the case where an inconsistency is detected in any of the sensor model ID, the measurement conditions, or the control parameters in the measurements of A1 to A3, the server 160 may transmit the inconsistent sensor model ID, measurement conditions, or control parameters to the measurement information terminal 140 at step S1308. In the measurement information terminal, the above information may be presented to the user through a display means or the like, thereby attaining an effect of prompting the user to perform measurement under consistent conditions. Thereafter, the flow may return to step S1101 of FIG. 11.

In another embodiment, the sensor model ID table 732 and the physical properties table 731 may be combined and associated directly with the sensor ID instead of the sensor model ID. In this case, similarities among the information associated with each sensor ID may be computed (by the processor 710 of the server 160 for example), and a semantic search for information highly similar to the information associated with the measurement ID may be performed and presented to the user or the like as described above.

Note that although the above describes supervised learning for identifying one type from among three types of known particles as an example, there may be any number of known particle types. In another embodiment, unsupervised learning such as clustering may also be performed.

Third Stage: Identification

Figure 17:
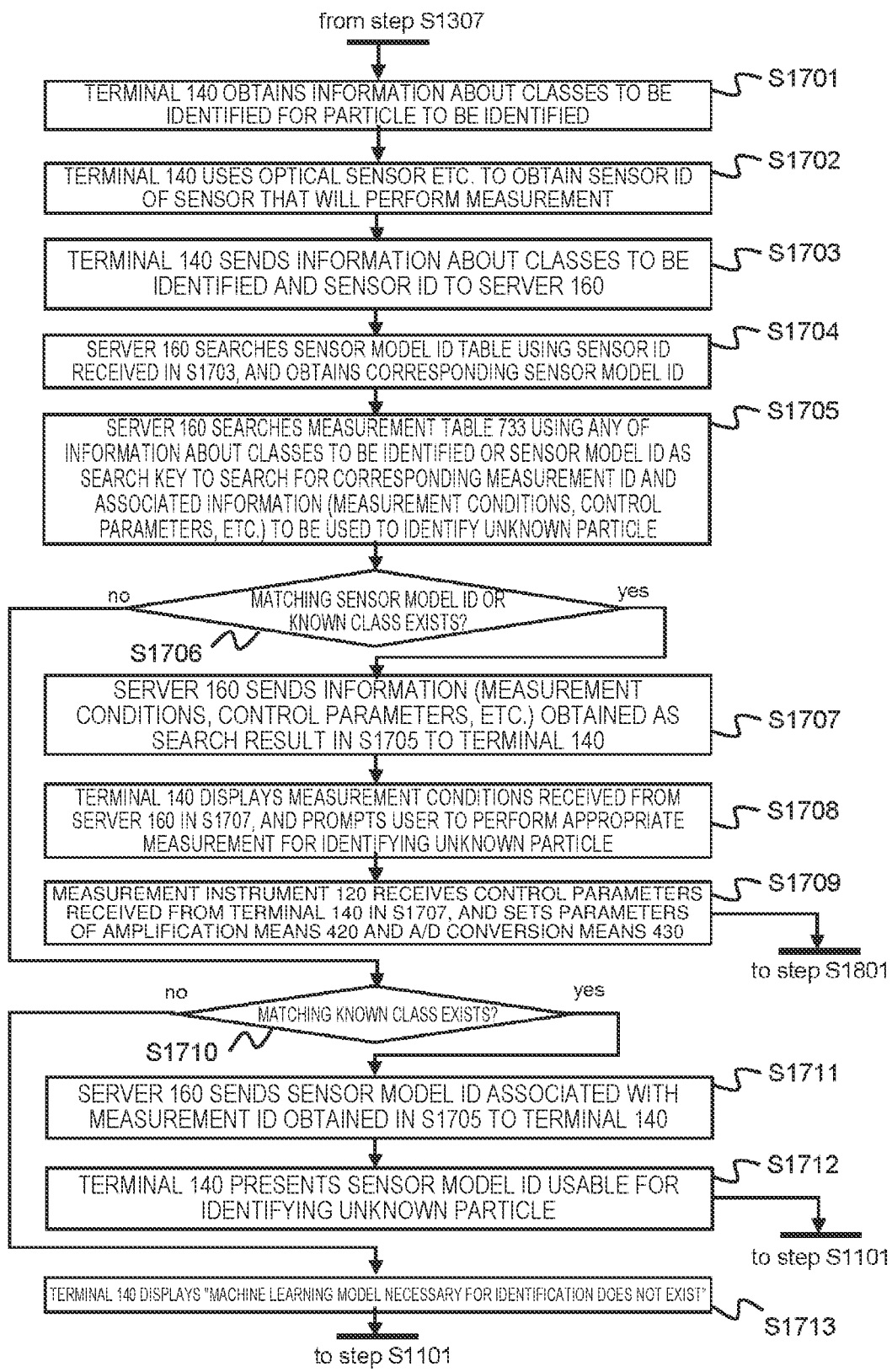
FIG. 17 is a flowchart for explaining an example of a third stage of a processing method according to an embodiment of the present invention.

Next, identification, which is the third stage of the processing method according to an embodiment of the present invention, will be described in detail with reference to FIGS. 17 to 19. In an embodiment, a training waveform acquired from a known particle and an identification waveform acquired from an unknown particle are preferably acquired under the same measurement conditions in consideration of improved identification accuracy. For example, a training waveform obtained from a particle of a type P passing through the pore of a sensor of a type M and an identification waveform obtained from a different particle of the type P passing through the pore of a sensor of a type N may have different characteristics due to differences between the sensors. In such a situation, the machine learning optimization parameters derived from the waveform of the sensor M may not have the ability to correctly identify the identification waveform acquired with the sensor N.

In an embodiment of the present invention, the above problem may be addressed by the following two methods, for example. Namely, in a first method, (information related to) various conditions that influence the measured waveform, such as the physical properties of the sensor used when measuring the training waveform and the properties of the amplification means and the digitizer, are stored in the server 160 and sent to the measurement information terminal 140 or additionally the measurement instrument 120 prior to performing the measurement for identification, such that the measurement is performed under the same conditions as the learning.

In a second method, (information related to) conditions that influence the measured waveform, such as the physical properties of the sensor used when measuring the training waveform and the properties of the amplification means and the digitizer, are learned together with the waveform features as teaching data during the learning performed in the server 160.

Besides the above two methods, additional modifications may be carried out according to the teachings of the present specification. For example, one or more from among machine learning optimization parameters learned using features and teaching labels in teaching data, the teaching labels, the physical properties of the sensor, the measurement instrument control parameters, or other measurement conditions may also be associated and used for identification.

Identification: First Method

Hereinafter, the flowchart in FIG. 17 will be used to describe the above first method. The classes to which an unknown particle to be identified (i.e., the specimen) may possibly belong are referred to as the "classes to be identified". In the above example, the three classes A1 to A3 are the classes to be identified. In another embodiment, there may be any number of classes to be identified, and the particles contained in a sample to be identified may include particles belonging to a plurality of classes.

Before obtaining an identification waveform from the unknown particle to be identified, first, the measurement information terminal 140 obtains information about the classes to be identified at step S1701. The information about the classes to be identified may be inputted by the keyboard 553, acquired by the server 160 through the network I/O 560, or stored in the storage 520 of the measurement information terminal 140. In other words, in step S1701, the information terminal 140 obtains information about three classes to be identified in order to identify which of the three classes A1, A2, or A3 the specimen belongs to.

Next, the measurement information terminal 140 performs an operation such as scanning the presentation means included on the sensor 110 with the optical sensor 552 to obtain the sensor ID of the sensor 110 to be used to measure the identification waveform at step S1702. The sensor ID may also be acquired from the sensor 110 through the measurement instrument 120 and the I/O 550. Note that although supervised learning is assumed in the description here, unsupervised learning such as clustering may be used in another embodiment. In the case of using unsupervised learning, step S1701 may be omitted.

Next, the measurement information terminal 140 sends the information about the classes to be identified obtained in S1701 and the sensor ID obtained in S1702 to the server 160 over a network such as the network 199 at step S1703.

The server 160 receiving the information searches the sensor model ID table 732 using the received sensor ID as a key, and obtains the sensor model ID of the sensor 110 obtained in step S1702 that will acquire the identification waveform at step S1704.

Additionally, the server 160 may use either or both of the information about the classes to be identified sent in step S1703 and the sensor model ID found by the search in step S1704 to search the measurement table 733 at step S1705, and confirm whether or not a measurement for which machine learning optimization parameters have been calculated was taken using a sensor of the same type as the sensor 110 (step S1706).

For example, in the case of using the measurement table 733 of FIG. 14, the row 1401 containing the known classes (A1, A2, and A3) consistent with the information about the classes to be identified may be found by search, and the corresponding sensor model ID "X001001" may be acquired.

Alternatively, a search may be performed to find a measurement taken using a sensor with the same sensor model ID as the sensor 110 to be used to measure the unknown particle, and corresponding information may be obtained. Otherwise, a search may be performed to find a measurement consistent with both the sensor model ID and the known classes. It should be understood from the content disclosed in the present specification that other information may also be used as the search key in another embodiment.

If the search is successful and corresponding information is obtained, the flow proceeds from step S1706 to step S1707. Additionally, the server 160 may transmit the information (such as the measurement conditions and control parameters) associated with the measurement ID in the measurement table 733 obtained by the search to the measurement information terminal 140.

The measurement information terminal 140 receiving the information may display conditions that the measurer should control, such as the type and concentration of buffer solution, the model of measurement device that should be used, and the equipment for connecting the sensor to the measurement instrument for example, on the display means 540 and thereby notify the measurer at step S1408.

Alternatively, in another embodiment, the configuration of some or all of the sensor, the measurement instrument, the measurement information terminal, and the management information terminal may be edited in hardware or in software on the basis of the information included in the notification, such that the measurement conditions related to the sensor are adjusted automatically.

In other words, according to any of the above embodiments, information such as the measurement conditions may be fed back from the server 160 to the measurer who actually uses the sensor or the device for measuring, thereby demonstrating an effect of enabling accurate and reliable identification of an unknown particle.

Furthermore, the measurement information terminal 140 may also send the control parameters sent by the server in step S1707 to the measurement instrument 120. The measurement instrument control means 450 included in the measurement instrument 120 receiving the information may set conditions related to the amplification means 420 and the A/D conversion means 430, such as the amplification factor and the sampling rate for example, on the basis of the received values at step S1709.

For example, the A/D conversion means 430 may be set to the digitized bit depth and sampling rate indicated by the data 1471 and 1491 and the amplification means 420 may be set to the amplification factor indicated by the data 1481 in a row in FIG. 14. As described above, the control parameters are not limited to the above and may be any parameters for changing the characteristics of the amplification means and the A/D conversion means.

In another embodiment, conditions such as the amplification factor and the sampling rate may be included in a notification to a terminal possessed by the user who uses the measurement instrument 120, and the user may be prompted to adjust the measurement instrument 120.

In other words, the configuration of some or all of the sensor, the measurement instrument, the measurement information terminal, and the management information terminal may be edited in hardware or in software on the basis of the information included in the notification, such that the measurement conditions related to the measurement instrument are adjusted automatically.

In other words, according to any of the above embodiments, information such as the measurement conditions may be fed back from the server 160 to the measurer who actually uses the measurement instrument or the measurement instrument, thereby demonstrating an effect of setting the measurement instrument efficiently and enabling accurate and reliable identification of an unknown particle.

After that, the flow proceeds to step S1801 of FIG. 18 described later.

Figure 18:
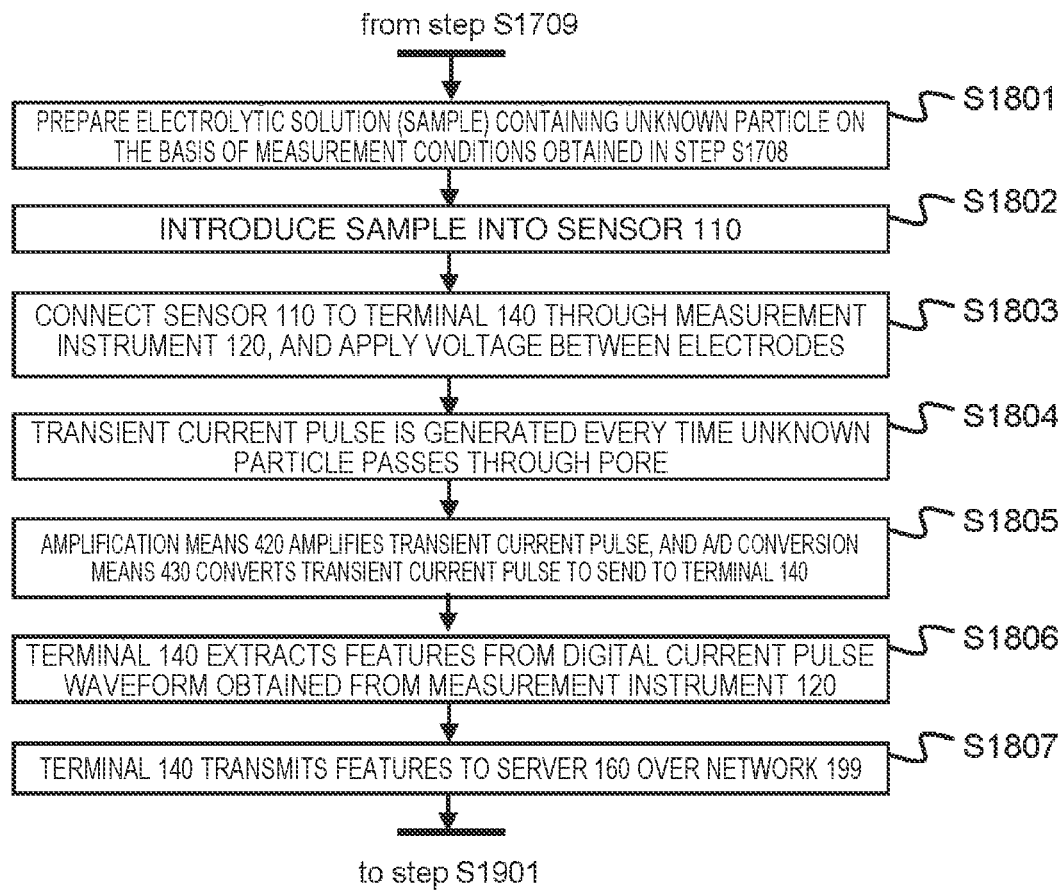
FIG. 18 is a flowchart for explaining an example of a third stage of a processing method according to an embodiment of the present invention.

FIG. 18 illustrates a flow related to the measurement of a specimen to be identified. The electrolytic solution containing an unknown particle (hereinafter simply referred to as the "sample") may be prepared at step S1801, on the basis of the measurement conditions obtained in step S1708. The preparation may be performed by the user on the basis of information displayed on a computer device such as the measurement information terminal 140, or by a preparation device automatically.

Thereafter, the sample is introduced into the sensor 110 automatically by the user or by some kind of device automatically at step S1802.

The sensor 110 is connected to the measurement information terminal 140 through the measurement instrument 120. Additionally, a voltage is applied between the electrodes in contact with the electrolytic solution inside the sensor 110 at step S1803.

Accordingly, every time an unknown particle in the sample passes through the pore in the sensor 110, a pulse is generated by a transient change in the current between the electrodes at step S1804.

The pulse waveform is amplified by the amplification means 420, converted to a digital signal by the A/D conversion means 430, and then sent to the measurement information terminal 140 at step S1805. One or a plurality of pulse waveforms may be acquired at this point. In general, higher particle identification accuracy is achieved as more pulse waveforms are acquired.

Thereafter, the feature quantity extraction means 511 of the measurement information terminal 140 extracts features from each pulse waveform received in step S1805, and sends the features to the server 160 over a network such as the network 199 at step S1807. Obviously, the computer device that extracts features may be freely selected, similarly to the description above. After that, the flow proceeds to step S1901 of FIG. 19 described later.

Figure 19:
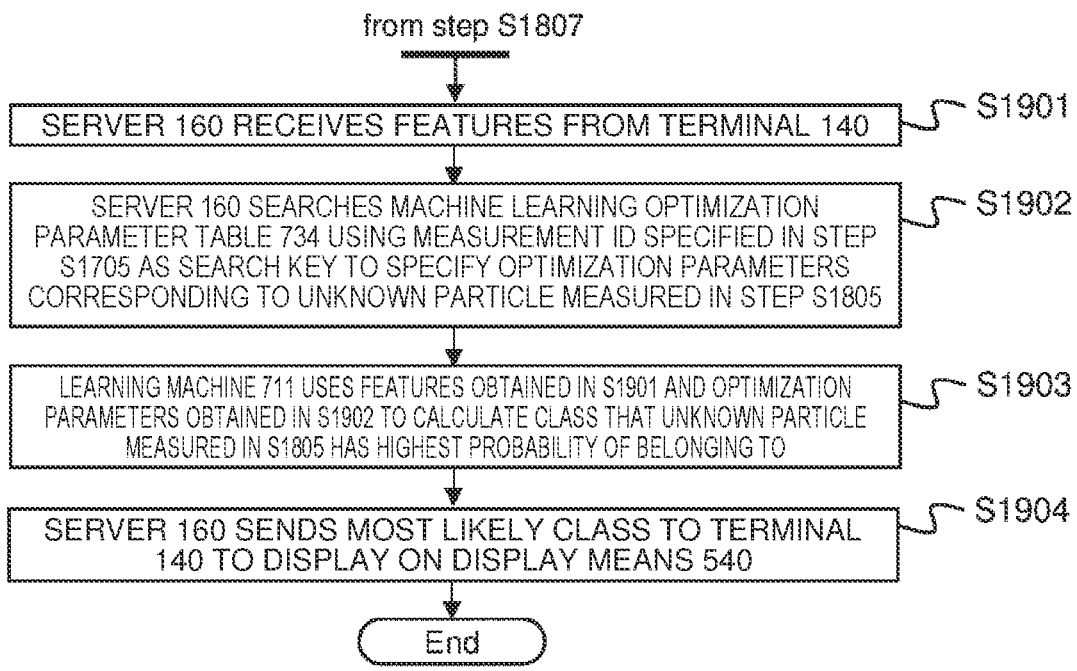
FIG. 19 is a flowchart for explaining an example of a third stage of a processing method according to an embodiment of the present invention.

FIG. 19 illustrates a flow related to the identification of an unknown particle. First, the server 160 receives the features of the pulse waveform data from an unknown particle at step S1901. In the example described here, it is assumed that the unknown particle is determined to belong to one of A1, A2, or A3.

In step S1705 above, the server 160 has already specified the measurement ID 1401 necessary for identifying whether the unknown particle is A1, A2, or A3 using the sensor 110. Consequently, by searching the machine learning optimization table 734 using the specified measurement ID as a search key, the server 160 searches for machine learning optimization parameters that have been optimized by treating the measurement conditions and the control parameters associated with the measurement ID as preconditions at step S1902. In the case of using the machine learning optimization table 734 illustrated in FIG. 16, all of the parameters in the row 1611 are returned as the search result.

Next, the learning machine 711 of the server 160 inputs the features obtained in step S1901 into a machine learning model (for example, the deep machine learning model of FIG. 15) with the parameters obtained in step S1902 substituted in. The class that the unknown particle has the highest probability (highest likelihood) of belonging to is calculated as the output from the machine learning model at step S1903.

The server 160 sends the above calculation result to the measurement information terminal 140 as an answer (identification result). The measurement information terminal 140 may display the identification result on the display means 540 or the like at step S1904. This completes the series of identification processes.

Returning to FIG. 17, when searching the measurement table in step S1706, a record matching the sensor model ID or the known class information may not be found by the search in some cases. In such cases, the flow proceeds to step S1710, and it is determined whether matching known class information exists.

The case where matching known class information exists means that learned optimization parameters capable of identifying the specimen to be identified exist, but the data used for the learning was measured using a different type of sensor. Consequently, in this case, the server 160 sends the sensor model ID obtained by the search in step S1705 to the measurement information terminal 140 at step S1711.

Additionally, the measurement information terminal 140 may present a sensor model ID that may be used to measure the unknown particle through the display means 540 at step S1712. In other words, on the basis of information related to the sensor model ID, the user (measurer) is able to select a sensor for identifying the unknown particle that is usable with the machine learning optimization parameters for identifying which of the known classes of particles A1, A2, or A3 the unknown particle corresponds to. In the case where a plurality of sensor model IDs are returned by the search in step S1704, the plurality of sensor model IDs may be displayed in step S1712.

In another embodiment, the configuration of some or all of the sensor, the measurement instrument, the measurement information terminal, and the management information terminal may be edited in hardware or in software on the basis of the information related to the sensor model ID, such that an appropriate sensor (a sensor corresponding to the sensor model ID) is selected, set, and prepared automatically.

In other words, according to any of the above embodiments, information related to an appropriate sensor for measuring an unknown particle may be fed back from the server 160 to the measurer or the device used by the measurer, and a sensor may be selected and set appropriately.

Also, the case where a matching known class does not exist in step S1710 means that machine learning optimization parameters for identifying whether the unknown particle is particles A1, A2, or A3 are not saved in the server 160.

In this case, the server 160 may notify the measurement information terminal 140 that there is no search result. The measurement information terminal 140 may inform the measurer through the display means 540 that "a machine learning model necessary for identification does not exist" (step S1713). In response, the measurer may return to the learning in the second stage (step S1101) of the identification process and perform a learning process, or abort identification.

In another embodiment, the configuration of some or all of the sensor, the measurement instrument, the measurement information terminal, and the management information terminal may be edited in hardware or in software on the basis of the lack of a machine learning model necessary for identification of the unknown particle, such that an appropriate learning process is executed automatically.

According to the first identification method according to an embodiment of the present invention described above, the sensor physical property information, the measurement instrument control parameters, the measurement conditions, and the like are made consistent between the measurement for learning using known particles and the measurement for identification using an unknown particle, thereby exhibiting an effect of enabling reliable and accurate identification. This is because the features of the pulse waveforms for learning that may be acquired in the flow of FIG. 11 may change depending on the measurement conditions and the measurement instrument parameters when the pulse waveforms are acquired, and consequently it is preferable to make the measurement conditions and the measurement instrument parameters consistent between learning (S1307) and identification (S1903). In an embodiment, a server, a system, an information terminal, a measurement instrument, and a sensor for executing an identification process including such an identification method may be provided.

The system and the like according to the above embodiment make it possible to use sensors with different physical properties during learning and identification, and thereby dramatically expand the range of application of particle identification. Similarly, an effect is also exhibited by which correct identification is possible even if different measurement conditions and different measurement instrument control parameters are used during learning and identification.

Note that the above examples are described by taking an example in which the known class information expresses a single type of particle. In another embodiment, a known class may also be a label expressing a set of multiple types of particles, and furthermore, some of the multiple types of particles may be known or unknown. In other words, the known class information may also be a label expressing a set of particles of an unknown nature.

Identification: second method

The second method according to an embodiment of the present invention is generally similar to the first method, but with the following differences. Namely, in the second method, not only the features (waveform features) extracted from pulse waveforms but also some or all of the information (such as the physical properties, measurement conditions, and measurement instrument control parameters) stored by the server in step S1301 are also treated as features. Moreover, the above features are used to train the learning machine 711.

In addition, in the identification of an unknown particle, the information (such as the physical properties, measurement conditions, and measurement instrument control parameters) learned as features during learning are inputted in addition to the waveform features extracted from a pulse waveform into the trained machine learning model. This arrangement makes it possible for the trained machine learning model to output a correct result, even if some or all of the physical properties of the sensor, the measurement conditions, and the measurement instrument control parameters used during learning are different from those used during identification.

As an example, consider the case of identifying which of the three types of particles A1, A2, or A3 an unknown particle is. Additionally, assume that three types of sensors having a pore diameter (that is, one type of physical property of the pore) of 100 nm, 150 nm, and 200 nm, respectively, are used to measure the particles A1 and acquire pulse waveforms, and three sets of waveform feature quantity groups are obtained.

During learning, information indicating that the pore diameter is 100 nm may also be treated as a feature quantity in addition to the waveform feature group acquired by the sensor having the 100 nm pore diameter, and A1 may be learned as a teaching label. Similarly, the waveform feature quantities and the pore diameters are jointly treated as feature quantities for the sensors having the 150 nm pore diameter and the 200 nm pore diameter to learn A1 as a teaching label. Similar learning may also be performed with respect to A2 and A3.

When identifying an unknown particle using a machine learning model trained as above, the pore diameter of the sensor used during identification is also inputted in addition to waveform features.

The first method above has a limitation of being incapable of identification unless the physical properties of the sensor, the measurement conditions, and the measurement instrument control parameters are consistent between learning and unknown particle identification, but the second method is not constrained by the above limitation. For example, after performing learning with sensors having pore diameters of 100 nm, 150 nm, and 200 nm as described above, identification is possible according to the second method even if a sensor having a pore diameter of 120 nm is used to measure an unknown particle.

Component Partitioning

In the system according to an embodiment of the present invention, the sensor, the measurement instrument, the measurement information terminal, the management information terminal, and the server above are described as being respectively independent devices, but the functions (means, components) assumed by the above devices may be distributed freely to any device (group). Such distribution is referred to as "partitioning".

For example, the feature quantity extraction means may be included in the measurement information terminal 140, but may also be included in the server 160 and the measurement information terminal 140 may send pulse waveform information to the server 160 directly. Furthermore, in another embodiment, the feature quantity extraction means may be included in the measurement instrument 120 or in any or all of the sensors 100, 101, and 110.

Also, in another embodiment, the amplification means may be included in the sensors.

Typically, the degree of freedom in information processing increases the closer the location of such functions (means) is to the server (such as the server in FIG. 1), while on the other hand, costs may be lowered further the closer the location is to the sensors (such as the sensors in FIG. 1).

Figure 20:
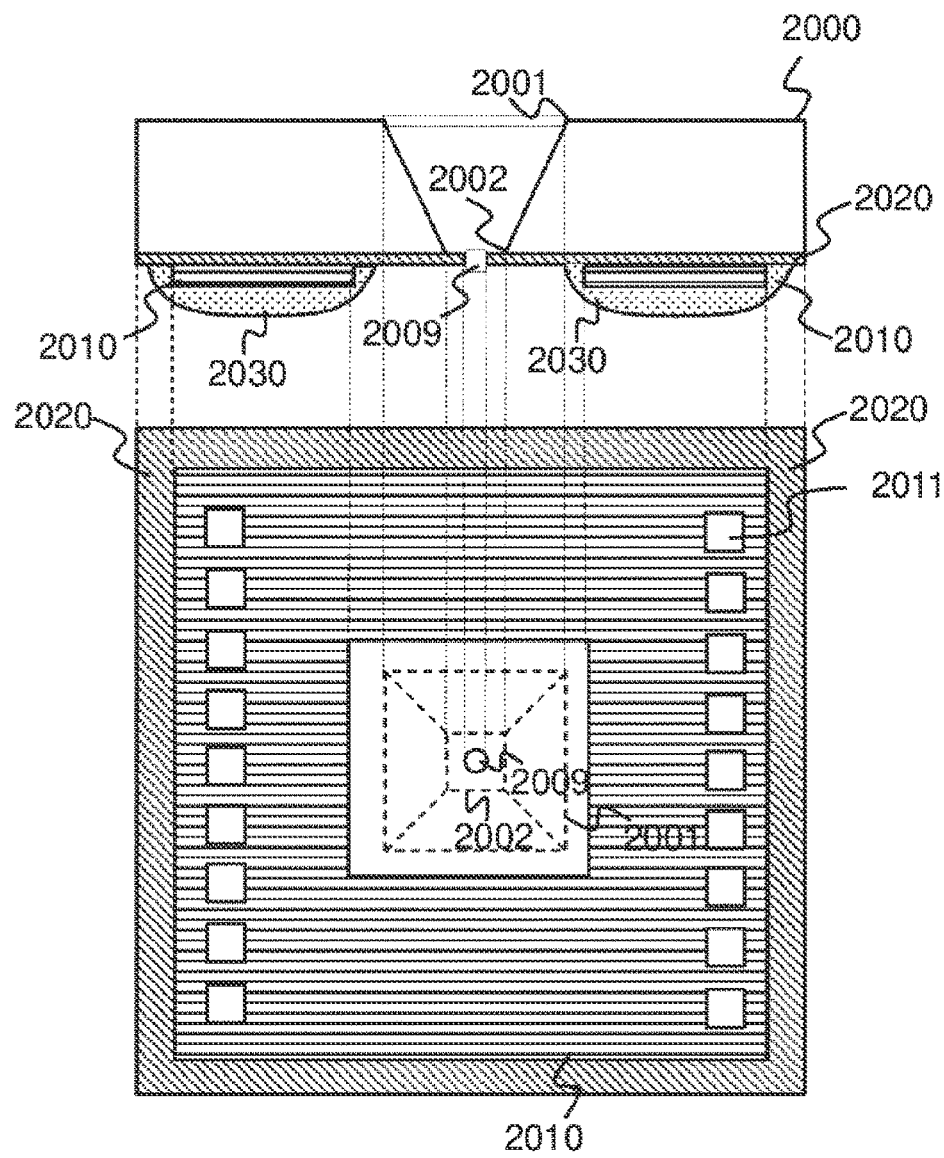
FIG. 20 is a partial diagram illustrating an example of a sensor including an amplification means and an A/D conversion means according to an embodiment of the present invention.

FIG. 20 illustrates an example of a sensor including an amplification means and an A/D conversion means according to an embodiment of the present invention. FIG. 20 is an enlarged partial view of a silicon wafer 2000 that includes the sensor.

In the lateral cross section illustrated in FIG. 20(a), a thin film (membrane) 2020 is disposed on one surface (in the diagram, the lower surface) of the silicon wafer 2000, and a pore 2009 is opened in the center thereof. The outline of the pore 2009 penetrating the silicon wafer 2000 is prescribed as a sloped face connecting a point 2001 to a point 2002. A semiconductor integrated circuit (chip) 2010 and an encapsulant 2030 are disposed on the thin film 2020. The semiconductor integrated circuit 2010 may provide at least some of the functions described above according to an embodiment of the present invention. The number of semiconductor integrated circuits 2010 is not limited to the example illustrated in the diagram, and any number may be used. The encapsulant 2030 has a role of protecting the semiconductor integrated circuit 2010, and may provide protection from corrosion or the like caused by the electrolytic solution, for example.

FIG. 20(b) is a view of FIG. 20(a) from below, and the dashed lines in the diagram represent the back of the thin film 2020 that is not directly visible. Also, the semiconductor integrated circuit 2010 and the encapsulant 2030 are omitted from illustration to aid comprehension. A plurality of electrode pads 2011 (in this example, the squares of the same shape in the diagram are all electrode pads) are disposed on the semiconductor integrated circuit 2010. The electrode pads 2011 may be used as a means for installing the semiconductor integrated circuit 2010, for supplying power to the semiconductor integrated circuit 2010, for inputting analog signals, for outputting digital signals, for reading out a sensor ID stored in a memory, and the like. The number of electrode pads 2011 is not limited to the example illustrated in the diagram, and any number may be used.

By implementing such a configuration in a sensor module forming a flow channel like the one illustrated in FIG. 2 for example, the wiring from the electrode pads to the flow channel electrodes (that is, the electrodes 212 and 222 in FIG. 2) may be provided by the sensor module itself. It should be understood that a similar approach allows for free partitioning according to the content disclosed in the present specification.

Figure 21:
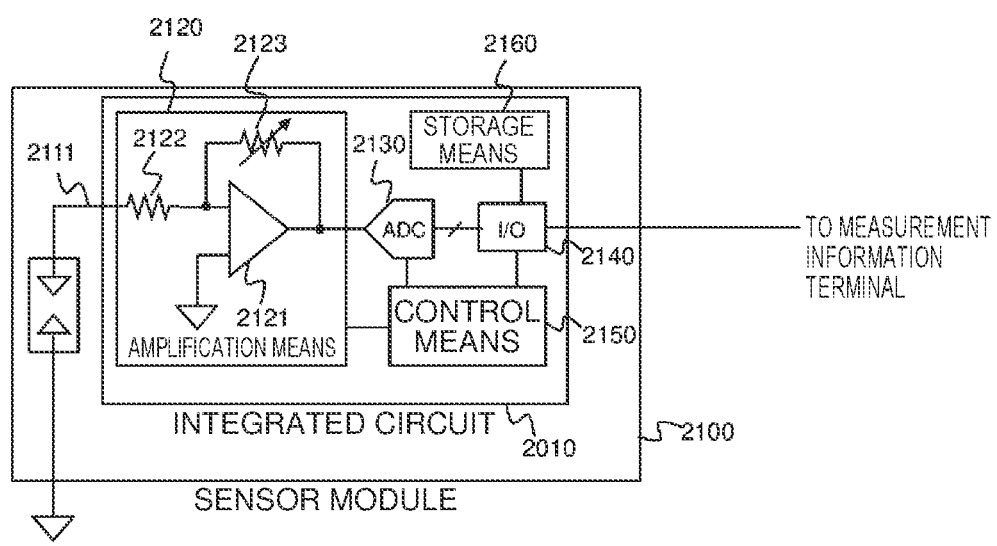
FIG. 21 illustrates an example of a semiconductor integrated circuit included in the sensor of FIG. 20.

FIG. 21 is an example in which an amplification means 2120, an A/D conversion means 2130, an I/O 2140, a measurement parameter control means 2150, and a storage means 2160 are included in the semiconductor integrated circuit 2010. In other words, the semiconductor integrated circuit 2010 includes substantially the same functions as the measurement instrument of FIG. 4, and may provide a device that doubles as a sensor and a measurement instrument. For example, a sensor ID associated with the sensor module may be saved in the storage means 2160.

In another embodiment, the semiconductor integrated circuit 2010 includes at least a sensor ID storage means and an I/O, and may also include some or all of an amplification means, an A/D conversion means, and a measurement parameter control means.

Providing a Particle Identification Processing Service Using a Network

As described above, partitioning may be considered when carrying out an embodiment of the present invention. For this reason, a provider and a user of a particle identification processing service respectively may possess one of each function (means), thereby making it possible to carry out an embodiment of the present invention.

For example, in the case of carrying out the system in FIG. 1, the provider is assumed to have the server 160, while the user is assumed to have the sensors 100, 101, and 110, the measurement instrument 120, the measurement information terminal 140, and the management information terminal 180. The user may purchase the sensors and the measurement instrument from the provider, and at the time of purchase, the provider may save a user ID for identifying the user in association with the sensor IDs of the provided sensors and the measurement instrument ID of the provided measurement instrument in a database (table) included in the server 160, for example.

On the basis of the database, the provider may provide data such as firmware, middleware, and update files for the measurement information terminal 140 and the management information terminal 180 over the network 199. The above arrangement makes it possible for the provider to maintain the compatibility of the overall system according to the present embodiment, while also attaining convenience and security improvements for the user.

Also, the user may transmit (input) data about a desired particle to be measured to the server 160 over the network 199. Such data may be inputted through a management web page accessible by logging in using the user ID, for example. The user may be a corporation or an individual. For a corporate user, a plurality of users belonging to the corporation who are associated with the corporate user (persons having a confidentiality agreement with respect to the business of the corporation, such as employees and business associates of the corporation) may be set. Such an arrangement makes it possible to integrate data provided from a plurality of users belonging to or having a business relationship with a certain corporation (such as a company, a laboratory, or a university) in the server 160.

Consequently, an effect is obtained whereby a certain user associated with the corporate more easily uses data obtained by an employee or associate of the corporation other than the certain user him- or herself, and more easily acquires a data set of appropriate machine learning optimization parameters and the like, while also upholding the duty of confidentiality. In other words, it is possible to dramatically reduce the number of cases where identification is unavailable with the first identification method described above. Alternatively, in the case of adopting the second identification method described above, it is possible to generate a more appropriate machine learning model.

In an embodiment, the provider may manage a unique user ID (a unique identifier for uniquely identifying each user) for each of a plurality of users.

For example, a first user may use the sensor 100, a second user may use the sensor 101, a third user may use the sensor 110, and each of the users may have a measurement instrument 120 and a measurement information terminal 140. Additionally, when the third user attempts to identify an unknown particle using the sensor 110 as described above and inputs/sends a notification to the server 160 of the provider, learning may be performed (by the learning machine 711 of the server 160, for example) using measurement results acquired by the first user and/or the second user. Thereafter, when the third user measures the unknown particle, the identification result may be obtained rapidly from the server 160.

By adopting a configuration like the above, it is possible to construct a global-scale system spanning networks and accumulate enormous amounts of data related to particle identification using sensors according to an embodiment of the present invention. In other words, the provider may provide a platform related to particle identification.

In the embodiments of the present invention, the method described above may be provided, and moreover, a device (hardware) capable of carrying out the method, a program, and a product (such as any medium, carrier wave, or module) storing some or all of the program in a user-executable format may also be provided.

REFERENCE SIGNS LIST 100 sensor (sensor module)
101 sensor
110 sensor
120 measurement instrument
140 measurement information terminal
160 server
180 management information terminal
199 network
200 sensor
210 chamber
211 electrolytic solution inlet
212 electrode
220 chamber
221 electrolytic solution inlet
222 electrode
230 partition
241 silicon wafer 242 thin film (membrane)
250 amplifier (amp)
251 ammeter
252 power source
290 pore
300 sensor
311 electrolytic solution inlet
323 face
390 presentation means
411 input/output means
420 amplification means
421 operational amplifier
422 resistor
423 feedback resistor
430 A/D conversion means
440 input/output means
450 measurement instrument control means
460 storage means
510 processing means (processor)
511 feature quantity extraction means
520 main storage means (storage)
530 memory
540 display means
550 input/output means
552 optical sensor
553 keyboard
560 network input/output means
610 processing means (processor)
620 main storage means (storage)
630 memory
640 display means
650 input/output means
651 connection to external storage device
652 optical sensor
653 keyboard
710 processing means (processor)
711 learning machine
712 feature quantity extraction means
720 memory
730 main storage means (storage)
731 physical properties table
732 sensor model ID table
733 measurement table
734 machine learning optimization table
740 display means
750 network input/output means
810 column expressing sensor model ID
811 row
812 row
813 row
820 column
821 variable type/unit information
823 data
830 column
833 data
840 column
843 data
850 column
853 data
860 column
863 data
870 column
873 data
880 column
881 variable type/unit information
883 data
910 column
911 sensor ID
912 sensor ID
913 sensor ID
914 sensor ID
915 sensor ID
916 sensor ID
920 column
921 sensor model ID
922 sensor model ID
923 sensor model ID
924 sensor model ID
925 sensor model ID
926 sensor model ID
1200 particle
1201 pore
1210 first state
1211 ion current waveform
1220 second state
1221 ion current waveform
1230 third state
1231 ion current waveform
1400 column
1401 row
1402 row
1403 row
1404 row
1410 column
1411 data
1420 column
1421 data
1430 column
1440 column
1450 column
1460 column
1470 column
1471 data
1480 column
1481 data
1490 column
1491 data
1610 column
1611 row
1612 row
1613 row
1620 column
1630 column
1640 column
2000 silicon wafer
2001 point
2002 point
2009 pore
2010 semiconductor integrated circuit
2020 thin film (membrane)
2030 encapsulant
2120 amplification means
2130 A/D conversion means
2140 I/O
2150 measurement parameter control means
2160 storage means

The invention claimed is:

1. A sensor for particle identification, the sensor comprising:
a first chamber configured to receive an electrolytic solution;
a first electrode provided inside the first chamber and configured to connect to an external power supply for applying a voltage;

a second chamber configured to receive the electrolytic solution;

a second electrode provided inside the second chamber and configured to be connected to the external power supply;

a data output means configured to output measurement data expressing an ion current generated between the first electrode and the second electrode;

a partition separating the first chamber and the second chamber; and a presentation means for providing a unique identifier to an external computer device over a network, wherein the partition includes a pore connecting the first chamber and the second chamber, a physical property of the sensor is associated with the unique identifier, the sensor is configured such that when a particle passes through the pore, a transient change dependent on at least a physical property of the pore and a physical property of the particle occurs in the ion current generated between the first electrode and the second electrode, the unique identifier is configured to cause the external computer device receiving the unique identifier to perform a process of identifying the particle according to the physical property of the sensor associated with the unique identifier, and the physical property of the sensor at least includes a physical property of the pore.

2. The sensor according to claim 1, wherein the external computer device includes a client terminal connected to the sensor, and the client terminal is connected to an external server over a network, and is configured to transmit information related to the process of identifying the particle.

3. The sensor according to claim 2, wherein the external server is configured to manage information related to a plurality of sensors including a first sensor and a second sensor, the first sensor is used to learn how to identify particles, and the second sensor is used to identify particles.

4. The sensor according to claim 1, wherein the external computer device includes an external server connectible to the sensor over a network.

5. The sensor according to claim 1, wherein the physical property of the sensor further includes one or more selected from the group consisting of a shape of the pore, a surface treatment applied to the pore, a material and a shape of the partition, a material and a shape of the first chamber, a material and a shape of the second chamber, a material and a shape of the first electrode, a material and a shape of the second electrode, a capacitance of the sensor, a type, concentration, and temperature of the electrolytic solution, and a fabrication history of the sensor.

6. A measurement instrument comprising:

the sensor according to claim 1;

an amplifier configured to amplify data outputted from the data output means included in the sensor;

a digitizer configured to A/D convert the data amplified by the amplifier; and a means that transmits the data A/D converted by the digitizer and the unique identifier provided by the presentation means included in the sensor to the external computer device.

7. The measurement instrument according to claim 6, wherein the unique identifier is additionally associated with a measurement instrument control parameter including one or more selected from the group consisting of an amplification factor and bandwidth of the amplifier and a sampling rate of the digitizer, and the unique identifier is configured to cause the external computer device receiving the unique identifier to perform a process of identifying the particle according to the physical property of the sensor and the measurement instrument control parameter associated with the unique identifier.

8. A computer device for particle identification comprising:

at least one processor;

at least one storage means;

a reading means configured to receive a first unique identifier associated with a first physical property of a first sensor and save the received first unique identifier in the storage means with the processor, wherein the first sensor is the sensor according to claim 1;

a feature quantity extraction means configured to receive first measurement data from the first sensor that measures a known particle belonging to a known class, extract first feature quantity information with the processor, and save the extracted first feature quantity information in the storage means; and a learning means configured to generate, with the processor, a machine learning optimization parameter by treating the first feature quantity information and the first physical property associated with the first unique identifier as teaching data and treating the known class as a teaching label.

9. The computer device according to claim 8, wherein the reading means is configured to receive a second unique identifier associated with a second physical property of a second sensor and save the received second unique identifier in the storage means with the processor, the feature quantity extraction means is configured to receive second measurement data from the second sensor that measures an unknown particle, extract second feature quantity information with the processor, and save the extracted second feature quantity information in the storage means, and the computer device further comprises an identification means for performing a process of identifying the unknown particle with the processor on a basis of the saved second feature quantity information by using the machine learning optimization parameter.

10. A system for particle identification, the system comprising:

the plurality of sensors according to claim 1; and a computer device configured to receive, from each of the plurality of sensors, a physical property of each sensor, measurement data measured by each sensor, and a unique identifier for each sensor over a network, and save the received information in association with each other in a database, wherein the computer device is configured to extract feature quantity information from measurement data related to a measurement of a known particle belonging to a known class performed by one or more of the plurality of sensors, generate a machine learning optimization parameter by treating at least the feature quantity information as teaching data, and save the generated machine learning optimization parameter in association with the unique identifier of each of the one or more sensors in the database, and the computer device is configured such that, when identifying an unknown particle using a specific sensor from among the plurality of sensors, the computer device searches the database for a machine learning optimization parameter usable for identifying the unknown particle with the specific sensor, and if an available machine learning optimization parameter exists, the computer device transmits, over a network, a notification including a measurement condition under which a measurement of the unknown particle by the specific sensor should be performed on a basis of a physical property of a sensor associated with the unique identifier associated with the available machine learning optimization parameter, and causes the specific sensor to adjust the measurement condition.

* * * * *